United States Patent
Rahman et al.

(10) Patent No.: US 11,637,732 B2
(45) Date of Patent: Apr. 25, 2023

(54) METHOD AND APPARATUS FOR HIGH-RESOLUTION CSI REPORTING IN ADVANCED WIRELESS COMMUNICATION SYSTEMS

(71) Applicant: Samsung Electronics Co., Ltd., Suwon-si (KR)

(72) Inventors: Md Saifur Rahman, Plano, TX (US); Eko Onggosanusi, Coppell, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/512,242

(22) Filed: Jul. 15, 2019

(65) Prior Publication Data
US 2020/0028555 A1    Jan. 23, 2020

Related U.S. Application Data

(60) Provisional application No. 62/830,929, filed on Apr. 8, 2019, provisional application No. 62/828,101, filed
(Continued)

(51) Int. Cl.
*H04L 27/26* (2006.01)
*H04B 7/0456* (2017.01)
(Continued)

(52) U.S. Cl.
CPC ....... *H04L 27/2634* (2013.01); *H04B 7/0486* (2013.01); *H04B 7/0626* (2013.01);
(Continued)

(58) Field of Classification Search
CPC .. H04B 7/0486; H04B 7/0626; H04B 7/0639; H04B 7/0695; H04W 80/08; H04L 27/2627; H04L 27/2634
See application file for complete search history.

(56) References Cited

U.S. PATENT DOCUMENTS

2017/0302353 A1  10/2017  Rahman et al.
2018/0145737 A1  5/2018  Rahman et al.
(Continued)

FOREIGN PATENT DOCUMENTS

| WO | 2020189949 A1 | 9/2020 |
| WO | 2020209552 A1 | 10/2020 |
| WO | 2020220371 A1 | 11/2020 |

OTHER PUBLICATIONS

"3rd Generation Partnership Project; Technical Specification Group Radio Access Network; Evolved Universal Terrestrial Radio Access (E-UTRA); Physical channels and modulation (Release 15)", 3GPP TS 36.211 V15.6.0, Jun. 2019, 239 pages.
(Continued)

*Primary Examiner* — Sharmin Chowdhury

(57) ABSTRACT

Method and apparatus for high-resolution channel state information (CSI) reporting in advanced wireless communication systems. A method of operating a user equipment (UE) includes selecting, from a full basis set comprising N bases for a plurality of v layers, an intermediate basis set comprising N' bases that are common among the plurality of v layers and selecting, from the selected intermediate basis set, a basis subset comprising $M_l$ bases for each layer l of the plurality of v layers. The method further includes transmitting, to a base station (BS), indices of the N' bases included in the selected intermediate basis set and indices of the $M_l$ bases included in the selected basis subsets. N, N', and $M_l$ are positive integers; N'<N; $M_l$<N'; l∈{0, 1 ..., v−1}; and v is a rank value.

20 Claims, 14 Drawing Sheets

Related U.S. Application Data on Apr. 2, 2019, provisional application No. 62/826,243, filed on Mar. 29, 2019, provisional application No. 62/814,914, filed on Mar. 7, 2019, provisional application No. 62/700,041, filed on Jul. 18, 2018.

(51) Int. Cl.
  *H04B 7/06* (2006.01)
  *H04W 80/08* (2009.01)
(52) U.S. Cl.
  CPC ....... *H04B 7/0639* (2013.01); *H04L 27/2627* (2013.01); *H04W 80/08* (2013.01)

(56) References Cited

U.S. PATENT DOCUMENTS

| | | | | |
|---|---|---|---|---|
| 2019/0334591 A1* | 10/2019 | Liu | ........................ | H04B 7/06 |
| 2020/0007205 A1* | 1/2020 | Park | ..................... | H04B 7/0486 |
| 2020/0044702 A1* | 2/2020 | Kakishima | ........... | H04B 7/0626 |
| 2020/0186207 A1* | 6/2020 | Davydov | ............. | H04B 7/0426 |
| 2020/0195333 A1* | 6/2020 | Li | ........................ | H04W 72/04 |
| 2020/0228172 A1* | 7/2020 | Faxer | ................... | H04B 7/0695 |
| 2020/0403667 A1* | 12/2020 | Li | ....................... | H04B 7/0417 |
| 2021/0194654 A1* | 6/2021 | Zhang | ................... | H04L 5/0053 |

OTHER PUBLICATIONS

"3rd Generation Partnership Project;Technical Specification Group Radio Access Network; Evolved Universal Terrestrial Radio Access (E-UTRA); Multiplexing and channel coding (Release 15)", 3GPP TS 36.212 V15.6.0, Jun. 2019, 246 pages.
"3rd Generation Partnership Project; Technical Specification Group Radio Access Network; Evolved Universal Terrestrial Radio Access (E-UTRA); Physical layer procedures (Release 15)", 3GPP TS 36.213 V15.6.0, Jun. 2019, 551 pages.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.6.0, Jun. 2019, 133 pages.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.6.0, Jun. 2019, 960 pages.
"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.
"3rd Generation Partnership Project; Technical Specification Group Radio Access Network; NR; Multiplexing and channel coding (Release 15)", 3GPP TS 38.212 V15.6.0, Jun. 2019, 101 pages.
"3rd Generation Partnership Project; Technical Specification Group Radio Access Network; NR; Physical layer procedures for data (Release 15)", 3GPP TS 38.214 V15.6.0, Jun. 2019, 105 pages.
ISA/KR, International Search Report and Written Opinion of the International Searching Authority, International Application No. PCT/KR2019/008914, dated Nov. 18, 2019, 9 pages.
Fraunhofer Iis, et al., "Enhancements on Type—II CSI Reporting Scheme," R1-1806124, 3GPP TSG-RAN WG1 #93, Busan, South Korea, May 21-25, 2018, 7 pages.
Huawei, et al., "Further enhancements on CSI reporting and codebook design," R1-1807128, 3GPP TSG RAN WG1 Meeting #93, Busan, Korea, May 21-25, 2018, 6 pages.
ZTE, "Remaining issues on CSI reporting," R1-1805827, 3GPP TSG RAN WG1 Meeting #93, Busan, Korea, May 21-25, 2018, 5 pages.
Supplementary European Search Report dated Jul. 23, 2021, in connection with European Patent Application No. 19837577.6, 12 pages.
ZTE, "CSI Enhancement for MU-MIMO Support", 3GPP TSG RAN WG1 Meeting #97, R1-1906235, Reno, USA, May 13-17, 2019, 16 pages.

* cited by examiner

US 11,637,732 B2

METHOD AND APPARATUS FOR HIGH-RESOLUTION CSI REPORTING IN ADVANCED WIRELESS COMMUNICATION SYSTEMS

CROSS-REFERENCE TO RELATED APPLICATIONS AND CLAIM OF PRIORITY

The present application claims priority to:
U.S. Provisional Patent Application Ser. No. 62/700,041, filed on Jul. 18, 2018;
U.S. Provisional Patent Application Ser. No. 62/814,914 filed on Mar. 7, 2019;
U.S. Provisional Patent Application Ser. No. 62/826,243 filed on Mar. 29, 2019;
U.S. Provisional Patent Application Ser. No. 62/828,101 filed on Apr. 2, 2019; and
U.S. Provisional Patent Application Ser. No. 62/830,929 filed on Apr. 8, 2019.

The content of the above-identified patent documents is incorporated herein by reference.

TECHNICAL FIELD

The present disclosure relates generally to high-resolution CSI reporting in advanced communication systems.

BACKGROUND

Understanding and correctly estimating the channel in an advance wireless communication system between a user equipment (UE) and an gNode B (gNB) is important for efficient and effective wireless communication. In order to correctly estimate the channel conditions, the UE may report (e.g., feedback) information about channel measurement, e.g., CSI, to the gNB. With this information about the channel, the gNB is able to select appropriate communication parameters to efficiently and effectively perform wireless data communication with the UE.

SUMMARY

Embodiments of the present disclosure provide methods and apparatuses to enable high-resolution CSI reporting in an advanced wireless communication system.

In one embodiment, a UE is provided. The UE includes a processor and a transceiver operably connected to the processor. The processor is configured to select, from a full basis set comprising N bases for a plurality of v layers, an intermediate basis set comprising N' bases that are common among the plurality of v layers; and select, from the selected intermediate basis set, a basis subset comprising $M_l$ bases for each layer l of the plurality of v layers. The transceiver is configured to transmit, to a BS, indices of the N' bases included in the selected intermediate basis set and indices of the $M_l$ bases included in the selected basis subsets. N, N', and $M_l$ are positive integers; $N'<N$; $M_l<N'$; $l \in \{0, 1, \ldots, v-1\}$; and v is a rank value.

In another embodiment, a BS is provided. The BS includes a transceiver and a processor operably connected to the transceiver. The transceiver is configured to receive, from a UE, (i) indices of N' bases included in an intermediate basis set and (ii), for each layer l of a plurality of v layers, indices of $M_l$ bases included in a basis subset. The processor is configured to determine $M_l$ bases for each layer l of the plurality of v layers based on the received indices of the N' bases included in the intermediate basis set and the received indices of the $M_l$ bases included in the basis subsets. The N' bases in the intermediate basis set are common among the plurality of v layers and are selected from a full basis set comprising N bases. The $M_l$ bases in the basis subset for each layer l of the plurality of v layers are selected from the intermediate basis set. N, N', and $M_l$ are positive integers; $N'<N$; $M_l<N'$; $l \in \{0, 1, \ldots, v-1\}$; and v is a rank value.

In yet another embodiment, a method of operating a UE is provided. The method includes selecting, from a full basis set comprising N bases for a plurality of v layers, an intermediate basis set comprising N' bases that are common among the plurality of v layers and selecting, from the selected intermediate basis set, a basis subset comprising $M_l$ bases for each layer l of the plurality of v layers. The method further includes transmitting, to a BS, indices of the N' bases included in the selected intermediate basis set and indices of the $M_l$ bases included in the selected basis subsets. N, N', and $M_l$ are positive integers; $N'<N$; $M_l<N'$; $l \in \{0, 1, \ldots, v-1\}$; and v is a rank value.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
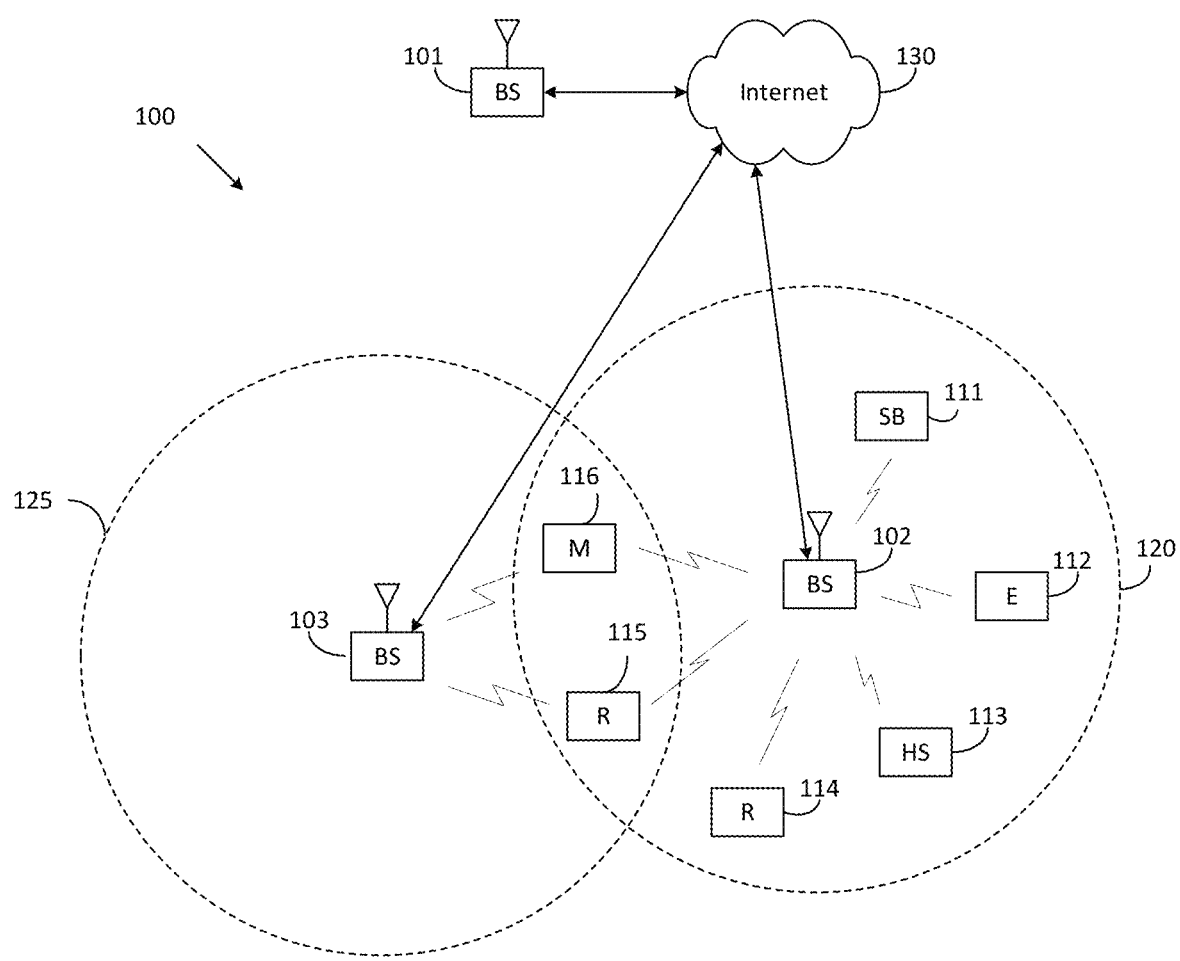
FIG. 1 illustrates an example wireless network according to embodiments of the present disclosure.

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v15.6.0, "E-UTRA, Physical channels and modulation;" 3GPP TS 36.212 v15.6.0, "E-UTRA, Multiplexing and Channel coding;" 3GPP TS 36.213 v15.6.0, "E-UTRA, Physical Layer Procedures;" 3GPP TS 36.321 v15.6.0, "E-UTRA, Medium Access Control (MAC) protocol specification;" 3GPP TS 36.331 v15.6.0, "E-UTRA, Radio Resource Control (RRC) Protocol Specification;" 3GPP TR 22.891 v1.2.0, "Study on New Services and Markets Technology Enablers;" 3GPP TS 38.212 v15.6.0, "E-UTRA, NR, Multiplexing and Channel coding;" and 3GPP TS 38.214 v15.6.0, "E-UTRA, NR, Physical layer procedures for data."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
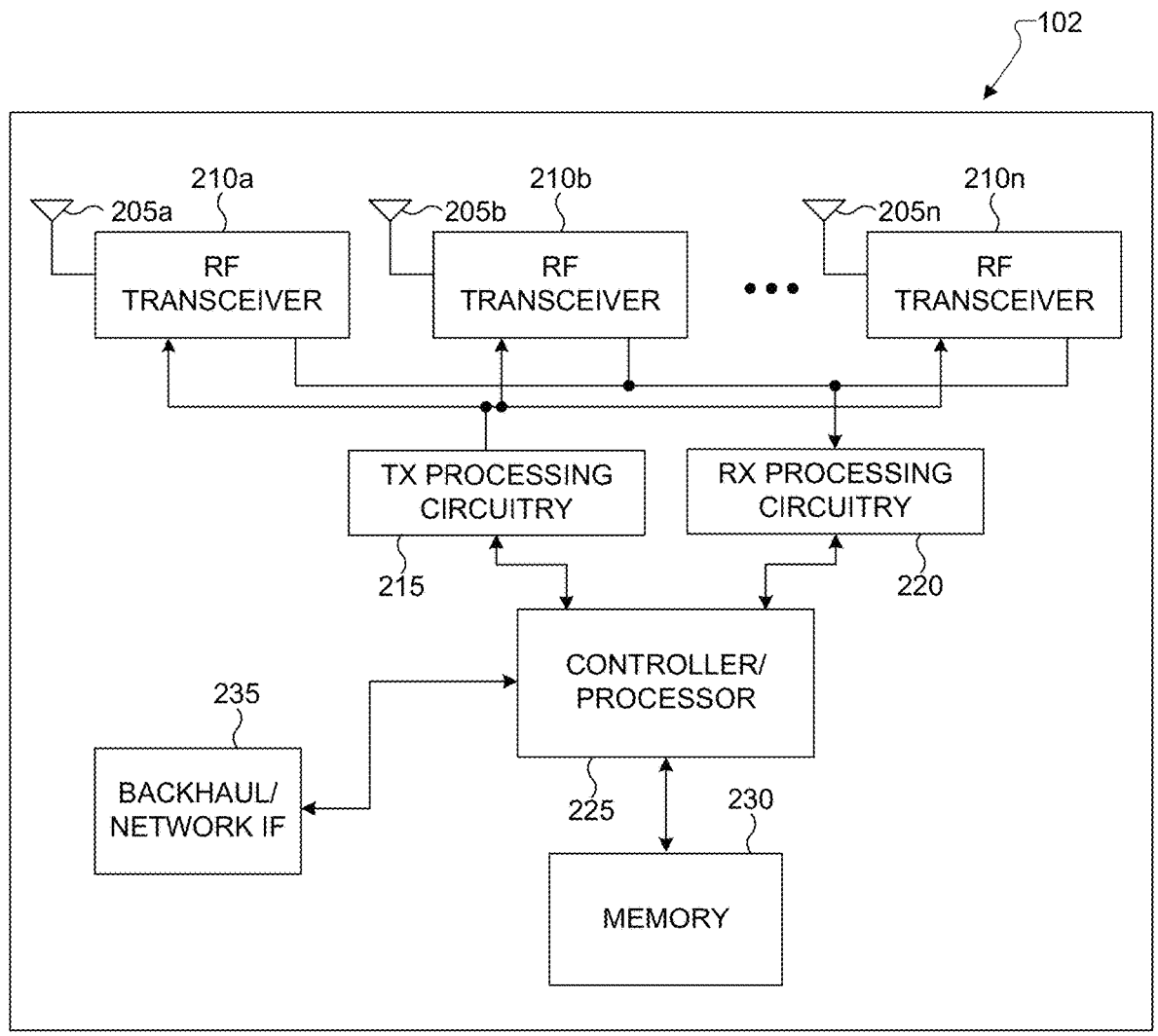
FIG. 2 illustrates an example gNB according to embodiments of the present disclosure.
Figure 3:
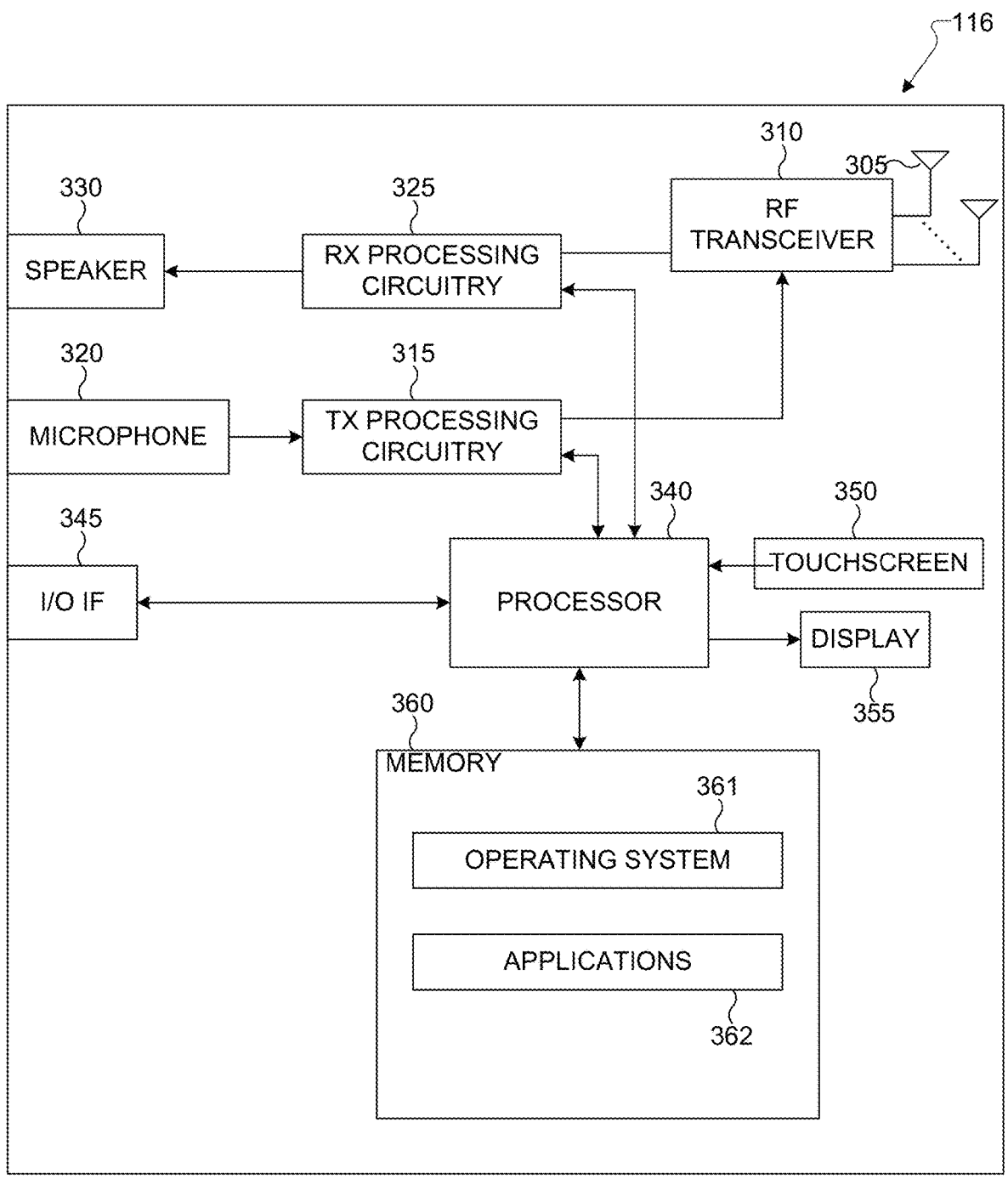
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient high-resolution CSI reporting in an advanced wireless communication system. In certain embodiments, and one or more of the gNBs 101-103 includes circuitry, programming, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
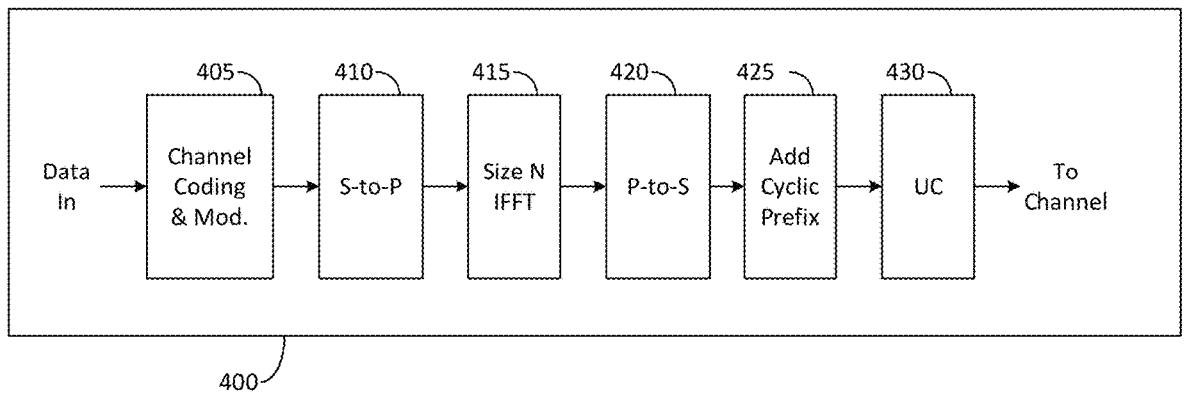
FIG. 4A illustrates a high-level diagram of an orthogonal frequency division multiple access transmit path according to embodiments of the present disclosure.
Figure 4B:
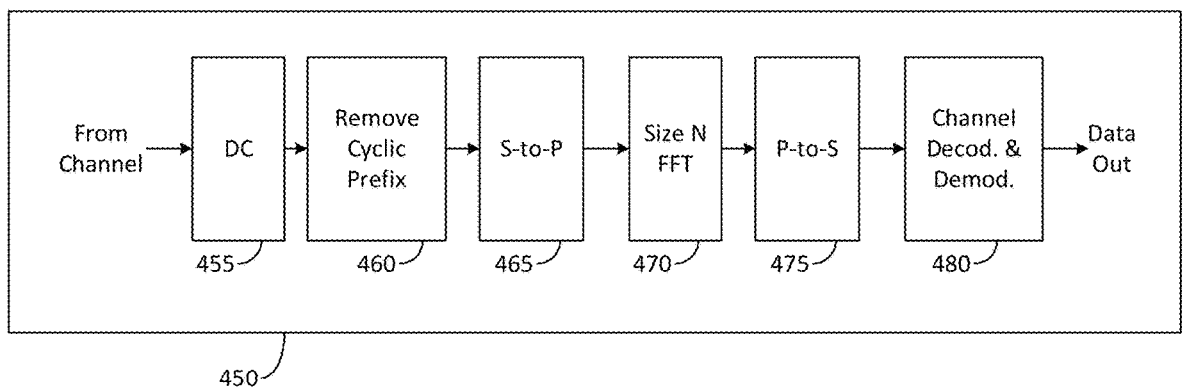
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{SB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
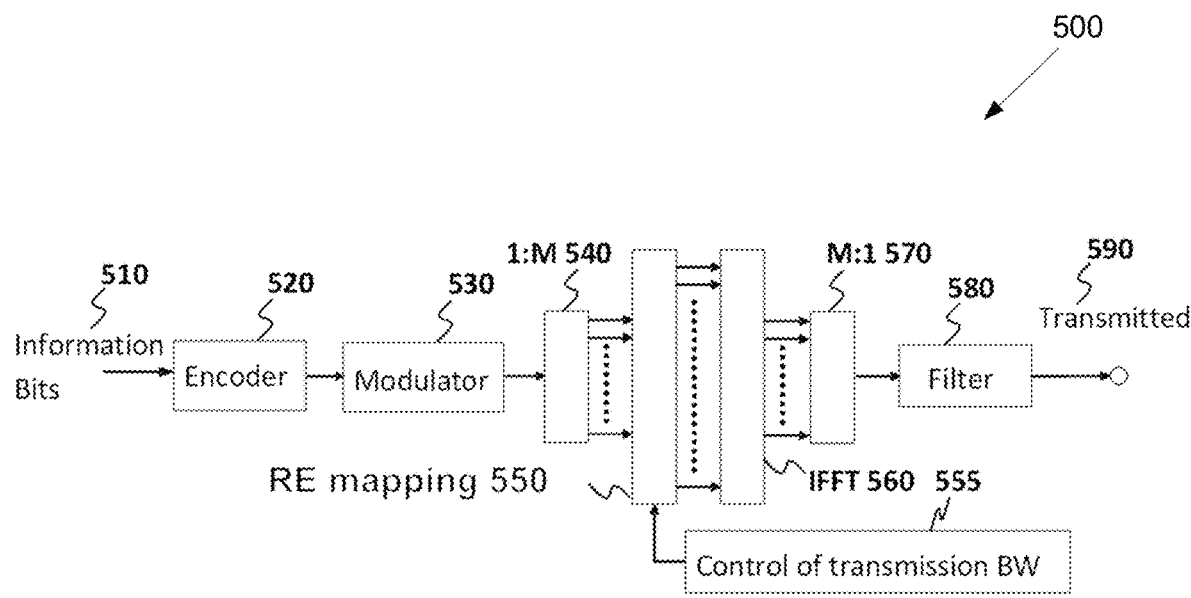
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of the present disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
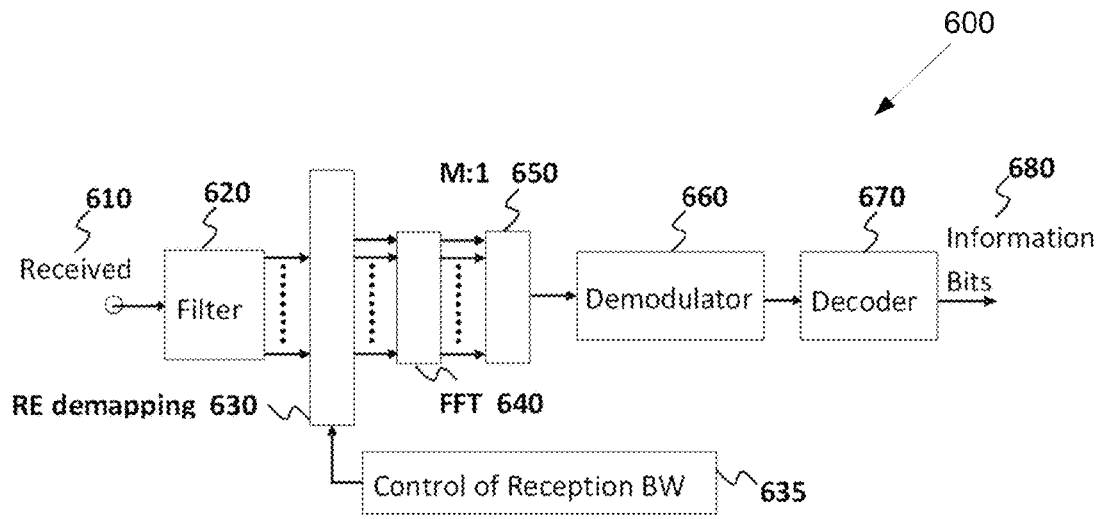
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of the present disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
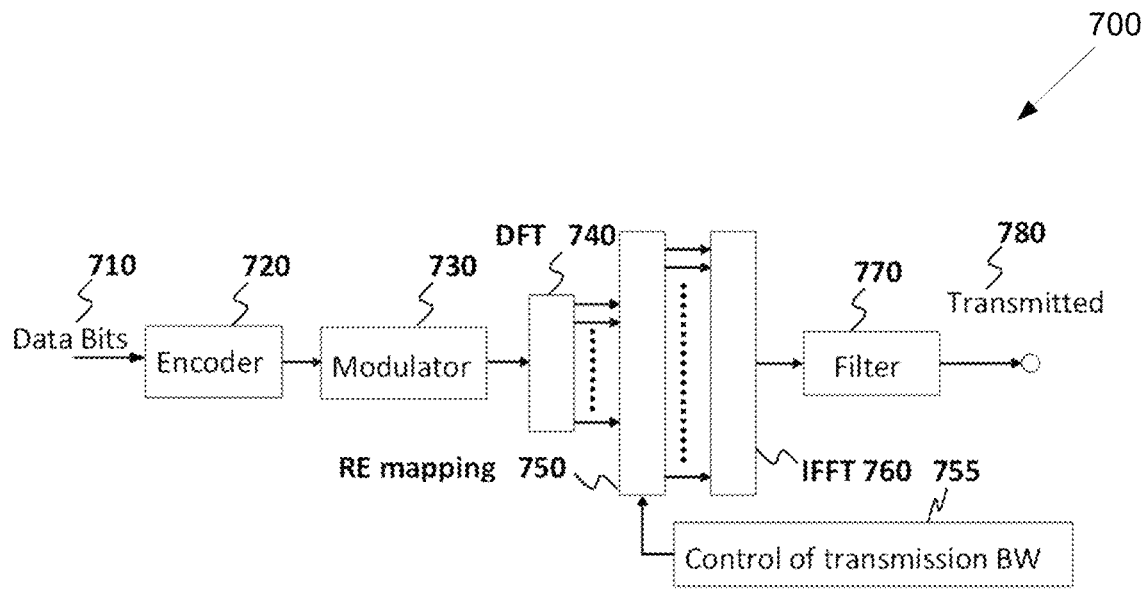
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of the present disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
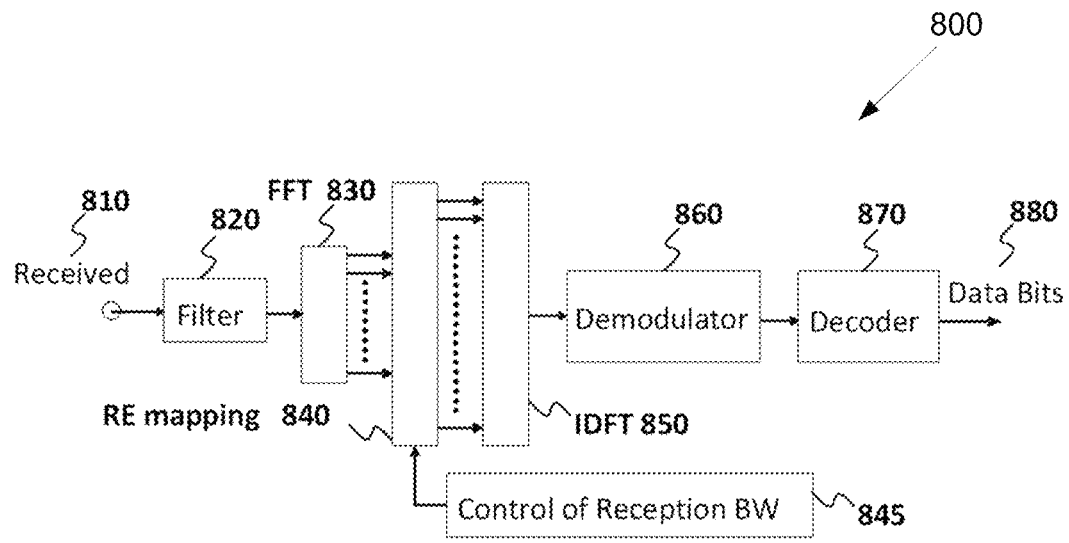
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of the present disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
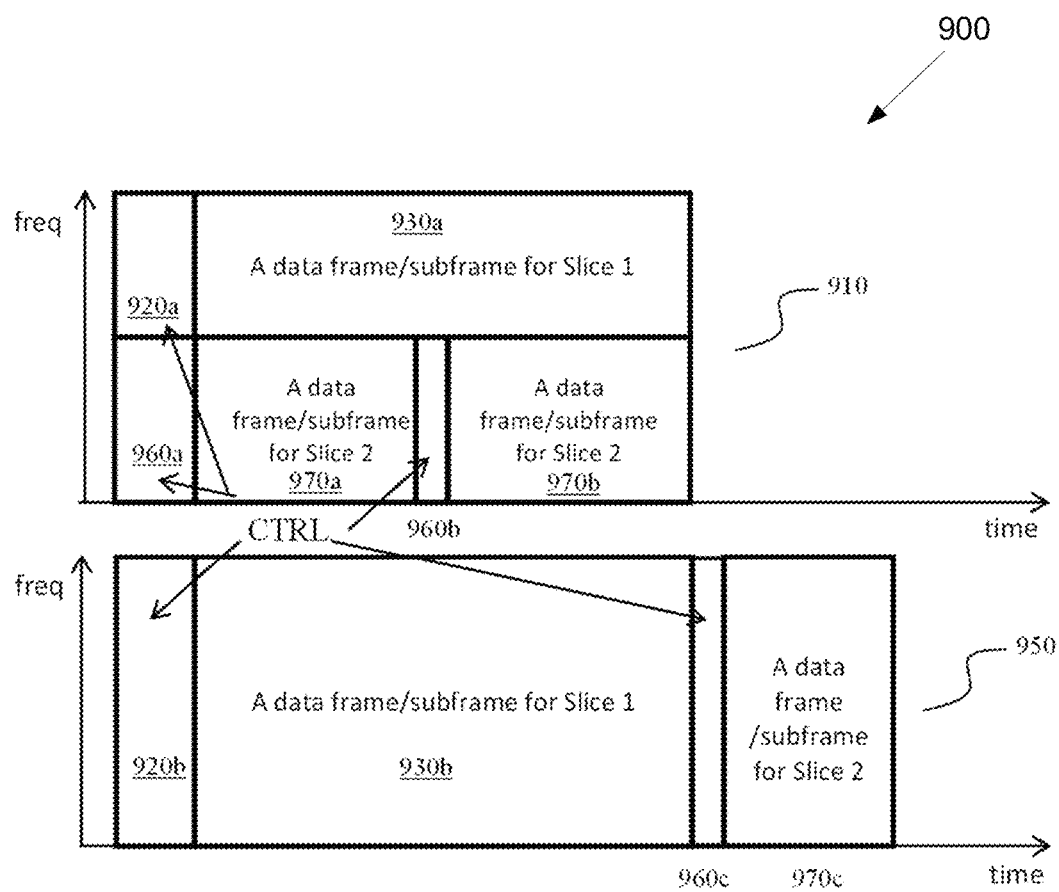
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of the present disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable an gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
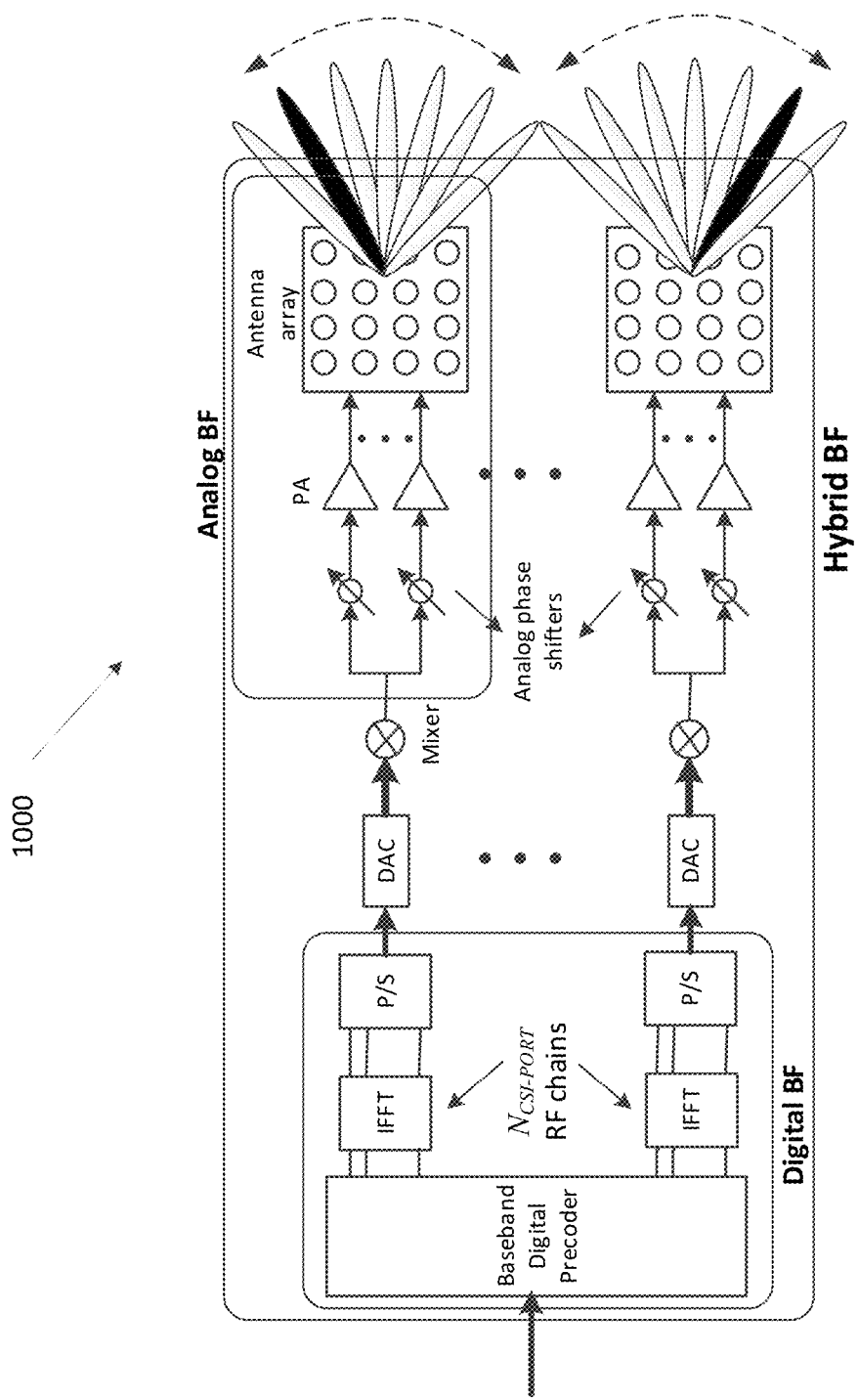
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of the present disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Figure 11:
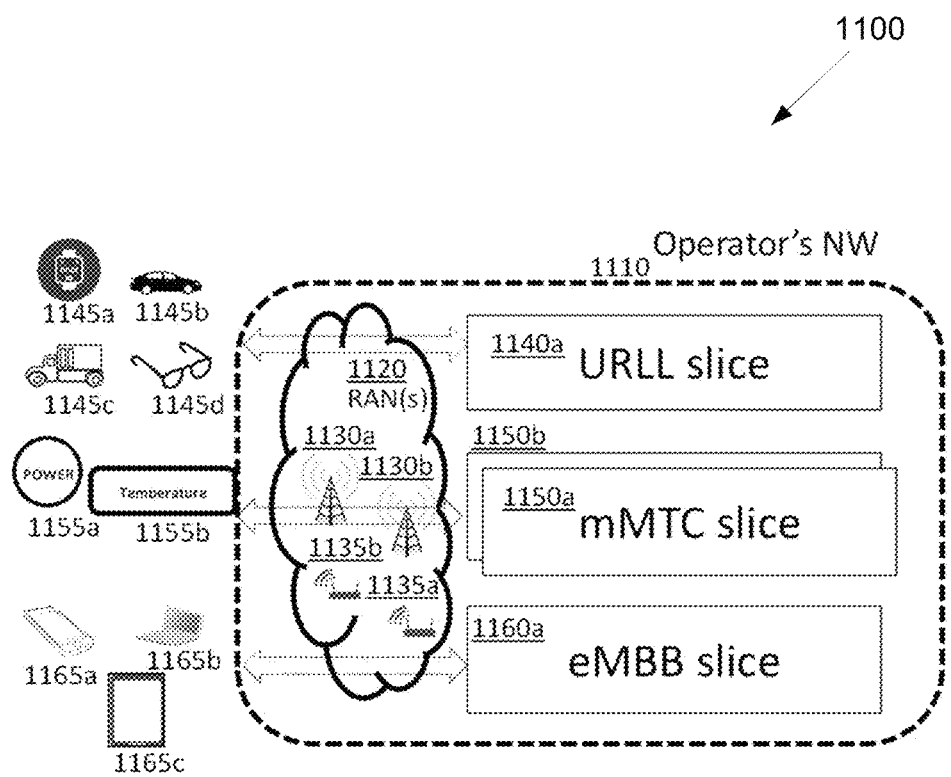
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of the present disclosure to any particular implementation of the configuration 1100.

In order for the 5G network to support such diverse services with different quality of services (QoS), one scheme has been identified in 3GPP specification, called network slicing.

As shown in FIG. 11, An operator's network 1110 includes a number of radio access network(s) 1120 (RAN(s)) that are associated with network devices such as gNBs 1130a and 1130b, small cell base stations (femto/pico gNBs or Wi-Fi access points) 1135a and 1135b. The network 1110 can support various services, each represented as a slice.

In the example, an URLL slice 1140a serves UEs requiring URLL services such as cars 1145b, trucks 1145c, smart watches 1145a, and smart glasses 1145d. Two mMTC slices 1150a and 550b serve UEs requiring mMTC services such as power meters 555b, and temperature control box 1155b. One eMBB slice 1160a serves UEs requiring eMBB services such as cells phones 1165a, laptops 1165b, and tablets 1165c. A device configured with two slices can also be envisioned.

Figure 12:
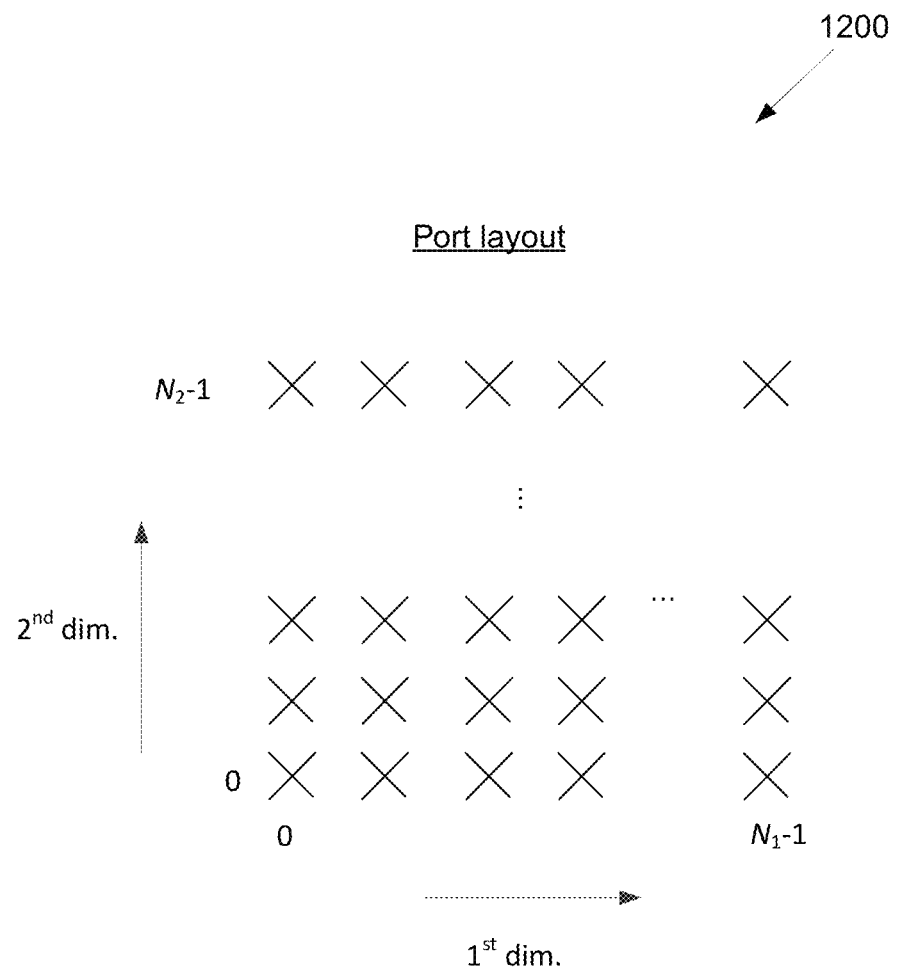
FIG. 12 illustrates an example antenna port layout according to embodiments of the present disclosure.

FIG. 12 illustrates an example antenna port layout 1200 according to embodiments of the present disclosure. The embodiment of the antenna port layout 1200 illustrated in FIG. 12 is for illustration only. FIG. 12 does not limit the scope of the present disclosure to any particular implementation.

In the present disclosure, it is assumed that $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. So, for a dual-polarized antenna port layout, the total number of antenna ports is $2N_1N_2$. An illustration is shown in FIG. 12.

In one embodiment, a dual-stage $W=W_1W_2$ codebook for rank 1-2 high-resolution (e.g., Type II) CSI reporting is supported wherein $W_1$ codebook is used to select: an orthogonal basis set comprising uniformly spaced ($N_1,N_2$) DFT beams; L beams freely out of the $N_1N_2$ DFT beams in the selected orthogonal basis set; strongest coefficient out of 2L coefficients (L beams and 2 polarizations); and WB amplitude of the remaining 2L−1 coefficients. In such embodiment, L∈{2,3,4} is higher-layer configurable. This selection is WB, i.e. common for all SBs configured for CSI reporting. The selected L beams are common for all layers and two polarizations (i.e., beams are layer-common and polarization-common), but the strongest coefficient and WB amplitude selection are independent for each layer (i.e., layer-specific).

In one embodiment, $W_2$ codebook is used to linearly combine (sum) the selected L beams independently per layer. The SB amplitude and SB phase of the combining coefficients are reported separately where SB amplitude reporting can be turned ON/OFF via higher-layer signalling parameter subbandAmplitude.

The pre-coding vector for layer l is given by:

$$W^l = \frac{1}{\sqrt{N_1 N_2 \sum_{i=0}^{2L-1} (p_{l,i}^{(1)} p_{l,i}^{(2)})^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix} \quad (1)$$

where $p_{l,i}^{(1)}$, $p_{l,i}^{(2)}$, and $\varphi_{l,i}$ correspond to the WB amplitude coefficient, SB amplitude coefficient, and SB phase coefficient for beam i and layer l, and the indices $m_1^{(i)}$ and $m_2^{(i)}$ are given by $$m_1^{(i)} = O_1 n_1^{(i)} + q_1$$
$$m_2^{(i)} = O_2 n_2^{(i)} + q_2$$

for beam i=0, 1, . . . , L−1, and the quantity $v_{l,m}$ (DFT beam) is given by:

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1. \end{cases}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

The rank R pre-coding matrix (whose columns correspond to pre-coding vectors for layers l=1, 2, . . . , R) is then given by $$W = \frac{1}{\sqrt{R}} [W^1 \quad W^2 \quad \cdots \quad W^R].$$

The pre-coding matrix W is indicated by a PMI which can be included in the Type II CSI reported by the UE.

With 2Rx antennae at the UE, the average system performance of Type II CSI over Type I CSI is large (up to ~30% in avg. user throughput). For 4Rx antennae at the UE (which is expected to be common in NR deployments), the gain is expected to be much more since the UE can report higher (i.e. rank 3-4) Type II CSI. However, the simple extension of the Type II CSI codebook for rank>2 has significantly large CSI reporting payload, which may not fit into the available resources for UCI carrying Type II CSI. It is therefore, desired to design rank>2 Type II CSI codebook which guarantees significant system performance but lower payload (e.g., payload comparable to rank 2).

The present disclosure proposes some example embodiments/components that can be used to achieve this goal. In the rest of the disclosure, a rank R CSI corresponds to a CSI that is derived/obtained assuming R layers (layer 1, layer 2, . . . , layer R) for transmission.

In one embodiment 1, a UE is configured (via higher layer signaling) to report high-resolution (e.g., Type II) CSI wherein the codebook to report rank 1-2 CSI corresponds to the NR specification Type II rank 1-2 CSI codebook, and the codebook to report rank>2 CSI corresponds to at least one of the following alternatives.

In one example of Alt 1-1, the codebook to report rank 3-4 Type II CSI corresponds to the NR Type I rank 3-4 CSI codebook, and the rank 5-8 Type II CSI reporting is not supported.

In one example of Alt 1-2, the codebook to report rank 3-4 Type II CSI corresponds to the NR Type I rank 3-4 CSI codebook except that the NR Rel. 15 Type I rank 3-4 CSI codebook for <16 ports is used for both <16 ports and >=16 ports, and the rank 5-8 Type II CSI reporting is not supported.

In one example of Alt 1-3, the codebook to report rank 3-8 Type II CSI corresponds to the NR Type I rank 3-8 CSI codebook.

In one example of Alt 1-4, the codebook to report rank 3-8 Type II CSI corresponds to the NR Type I rank 3-8 CSI codebook except that the NR Rel. 15 Type I rank 3-4 CSI codebook for <16 ports is used for both <16 ports and >=16 ports.

In one example of Alt 1-5, the codebook to report rank 3-4 Type II CSI corresponds to the rank 3-4 codebook proposed later in the present disclosure, and the rank 5-8 Type II CSI reporting is not supported.

In one example of Alt 1-6, the codebook to report rank 3-4 Type II CSI corresponds to the rank 3-4 codebook proposed later in the present disclosure, and the codebook to report rank 5-8 Type II CSI corresponds to the NR Type I rank 5-8 CSI codebook.

In one example of Alt 1-7, the codebook to report rank 3-8 Type II CSI corresponds to the rank 3-8 codebook proposed later in the present disclosure.

In one embodiment 2, a UE is configured (via higher layer signaling) to report high-resolution (aka Type II) CSI wherein the codebook to report the Type II CSI is dual-stage W=W1W2 in which the first-stage (W1) selects beams (e.g., DFT beams $v_{m_1^{(i)},m_2^{(i)}}$) for linear combination/sum (LC) according to at least one of the following alternatives.

In one example of Alt 2-1 (layer-specific beam selection), for each layer, M beams are selected for LC according to at least one of the following sub-alternatives.

In one instance of Alt 2-1-1, M beams are selected from L beams (where L≥M) which are common for all layers, and are selected from an orthogonal DFT basis comprising $N_1N_2$ beams. In an example, the PMI index $i_{1,1}$ indicates the orthogonal DFT basis, the PMI index $i_{1,2,0}$ indicates the L beams, and the PMI indices $i_{1,2,1}$, $i_{1,2,2}$, . . . , $i_{1,2,\nu}$ indicate M beams selected for layers 1, 2, . . . , R, respectively.

In one instance of Alt 2-1-2, L=M beams are selected from an orthogonal DFT basis comprising $N_1N_2$ beams. In an example, the PMI index $i_{1,1}$ indicates the orthogonal DFT basis, and the PMI indices $i_{1,2,1}, i_{1,2,2}, \ldots, i_{1,2,v}$ indicate M beams selected for layers $1, 2, \ldots, v$, respectively.

In one example of Alt 2-1A (layer-specific beam selection), for each layer l, $M_l$ beams are selected for LC according to at least one of the following sub-alternatives.

In one instance of Alt 2-1A-1, $M_l$ beams are selected from L beams (where $L \geq M_l$) which are common for all layers, and are selected from an orthogonal DFT basis comprising $N_1 N_2$ beams. In an example, the PMI index $i_{1,1}$ indicates the orthogonal DFT basis, the PMI index $i_{1,2,0}$ indicates the L beams, and the PMI indices $i_{1,2,1}, i_{1,2,2}, \ldots, i_{1,2,v}$ indicate $M_l$ beams selected for layers $1, 2, \ldots, R=v$, respectively.

In one instance of Alt 2-1A-2, $M_l$ beams are selected from an orthogonal DFT basis comprising $N_1 N_2$ beams. In an example, the PMI index $i_{1,1}$ indicates the orthogonal DFT basis, and the PMI indices $i_{1,2,1}, i_{1,2,2}, \ldots, i_{1,2,v}$ indicate $M_l$ beams selected for layers $1, 2, \ldots, R=v$, respectively.

In one example of Alt 2-2 (layer-pair-specific beam selection), for each pair of consecutive layers (i, i+1), M beams are selected for LC according to at least one of the following sub-alternatives.

In one instance of Alt 2-2-1, M beams are selected from L beams (where $L \geq M$) which are common for all pairs of consecutive layers, and are selected from an orthogonal DFT basis comprising $N_1 N_2$ beams. In an example, the PMI index $i_{1,1}$ indicates the orthogonal DFT basis, the PMI index $i_{1,2,0}$ indicates the L beams, and the PMI indices $$i_{1,2,1}, i_{1,2,2}, \ldots, i_{1,2,\lceil \frac{v}{2} \rceil}$$

indicate M beams selected for layer pairs (1, 2), (3, 4), ..., respectively.

In one instance of Alt 2-2-2, L=M beams are selected from an orthogonal DFT basis comprising $N_1 N_2$ beams. In an example, the PMI index $i_{1,1}$ indicates the orthogonal DFT basis, and the PMI indices $$i_{1,2,1}, i_{1,2,2}, \ldots, i_{1,2,\lceil \frac{v}{2} \rceil}$$

indicate M beams selected for layer pairs (1, 2), (3, 4), ..., respectively.

In one example of Alt 2-2A (layer-pair-specific beam selection), for each pair (1) of consecutive layers (i, i+1), $M_l$ beams are selected for LC according to at least one of the following sub-alternatives.

In one instance of Alt 2-2A-1, $M_l$ beams are selected from L beams (where $L \geq M_l$) which are common for all pairs of consecutive layers, and are selected from an orthogonal DFT basis comprising $N_1 N_2$ beams. In an example, the PMI index $i_{1,1}$ indicates the orthogonal DFT basis, the PMI index $i_{1,2,0}$ indicates the L beams, and the PMI indices $$i_{1,2,1}, i_{1,2,2}, \ldots, i_{1,2,\lceil \frac{v}{2} \rceil}$$

indicate $M_l$ beams selected for layer pairs (1, 2), (3, 4), ..., respectively.

In one instance of Alt 2-2A-2, $M_l$ beams are selected from an orthogonal DFT basis comprising $N_1 N_2$ beams. In an example, the PMI index $i_{1,1}$ indicates the orthogonal DFT basis, and the PMI indices $$i_{1,2,1}, i_{1,2,2}, \ldots, i_{1,2,\lceil \frac{v}{2} \rceil}$$

indicate $M_l$ beams selected for layer pairs (1, 2), (3, 4), ..., respectively.

In one example of Alt 2-3 (layer-common beam selection), for all layers, M=L beams are selected for LC from an orthogonal DFT basis comprising $N_1 N_2$ beams. In an example, the PMI index $i_{1,1}$ indicates the orthogonal DFT basis, and the PMI index $i_{1,2}$ indicates the L beams. For Alt 2-1-2, Alt 2-2-2 and Alt 2-3, the value L=M is either fixed, or higher layer configured. For Alt 2-1-1 and Alt 2-2-1, the value L and M are either fixed, or higher-layer configured. For Alt 2-1A-1 and Alt 2-2A-1, the value L and the set of values $\{M_l\}$ are either fixed, or higher-layer configured. Alternatively, for Alt 2-1-1 and Alt 2-2-1, the value L is higher-layer configured and M is either fixed or reported by the UE. Alternatively, for Alt 2-1A-1 and Alt 2-2A-1, the value L is higher-layer configured and the set of values $\{M_l\}$ is either fixed or reported by the UE.

In one example, the value M depends on rank. For instance, M decreases with rank: $M=L\in\{2, 3, 4\}$ for rank 1-2, M=2 for rank 3-4, and M=1 for rank 5-8.

In another example, the selection of M beams is WB, i.e. M beams are selected common for all SBs configured for CSI reporting. In another example, the selection of M beams is per SB, i.e., M beams are selected for each SB.

In one example, for Alt 2-1A, and Alt 2-2A, the set of value $\{M\}$ is such that $\Sigma_l M_l = \alpha$ where $\alpha$ is fixed for example, $\alpha = 2 L_{max}$ where $L_{max}$=maximum value of L for rank 2 CSI reporting.

In another example, for Alt 2-1A, and Alt 2-2A, the set of value $\{M\}$ is such that: $\Sigma_l M_l = \alpha$ where $\alpha$ is fixed for example, $\alpha = 2 L_{max}$ where $L_{max}$=maximum value of L for rank 2 CSI reporting; and $M_l \geq M_m$ for l<m.

In another example, for Alt 2-1A, and Alt 2-2A, the set of value $\{M\}$ is such that: $\Sigma_l M_l = \alpha$ where $\alpha$ is fixed for example, $\alpha = 2 L_{max}$ where $L_{max}$=maximum value of L for rank 2 CSI reporting; and $M_l \geq M_m$ for l<m.

In one sub-embodiment 2-1, the first-stage (W1) selects beams based on a combination of Alt 2-1, 2-2, 2-1A, 2-2A or/and 2-3. For example, for a subset of layers (S1), the beam selection is according to Alt X, and for another subset of layers (S2), the beam selection is according to Alt Y. A few examples are as follows.

In one example of Ex 2-1, S1={1, 2}, S2={3, 4}, X=2-3, and Y=2-1 or 2-1A.

In one example of Ex 2-2, S1={1, 2}, S2={3, 4}, X=2-1 or 2-1A, and Y=2-3.

In one example of Ex 2-3, S1={1, 2}, S2={3, 8}, X=2-3, and Y=2-1 or 2-1A.

In one example of Ex 2-4, S1={1, 2}, S2={3, 8}, X=2-1 or 2-1A, and Y=2-3.

In one sub-embodiment 2-2, the first-stage (W1) selects beams based on the value L. If $L \leq a$, then beam selection is according to Alt 2-2-2, i.e., L beams are selected for each consecutive layer-pair (i,i+1) independently, and if L>a, then beam selection is according to Alt 2-3, i.e., beams are selected common for all layers.

In one example, for rank 3-4 Type II CSI reporting, if L=2, then beam selection is according to Alt 2-2-2, i.e., L=2 beams are selected for each of layer-pair (1, 2) and (3, 4) independently, and if L=3-4, then beam selection is according to Alt 2-3, i.e., beams are selected common for all layers (1, 2, 3, 4).

In one embodiment 3, a UE is configured (via higher layer signaling) to report high-resolution (e.g., Type II) CSI wherein the codebook to report the Type II CSI is dual-stage W=W1W2 in which the second-stage (W2) selects coefficients (e.g., WB amplitude coefficient $p_{l,i}^{(1)}$, SB amplitude coefficient $p_{l,i}^{(2)}$, or/and SB phase coefficient $\varphi_{l,i}$) for linear combination/sum according to at least one of the following alternatives.

In one example of Alt 3-1, the number of beams (e.g., DFT beams $v_{m_1^{(i)},m_2^{(i)}}$) for LC is the same across layers, and hence the number of coefficients (which equals 2×number of beams) for LC is also the same across layers. This in turn implies that the payload (number of bits) to report the coefficients is the same for each layer.

In one example of Alt 3-2, the number of beams (e.g., DFT beams $v_{m_1^{(i)},m_2^{(i)}}$) for LC can be different across layers, and hence the number of coefficients (which equals 2×number of beams) for LC can also be different across layers. This in turn implies that the payload (number of bits) to report the coefficients can vary across layers.

Note that the number of beams for LC is assumed to be the same for the two antenna polarizations (i.e., the number of terms in each of the two summations in Equation 1 is assumed to be the same).

In one sub-embodiment 3-1, if L≤a, then the number of beams for LC is according to Alt 3-1, and if L>a, then it is according to Alt 3-2. For example, for rank 3-4 Type II CSI reporting, if L=2, then the number of beams for LC is according to Alt 3-1, and if L>2 (e.g., 3-4), then it is according to Alt 3-2.

Let $n_i$ be the number of beams linearly combined (summed) to obtain pre-coding vector for layer i.

In one sub-embodiment 3-2, for rank R, the candidates/hypotheses for equal/unequal number of beams (according to Alt 3-2) is determined based on the following conditions.

In one example, the total number of beams is fixed, i.e., $\Sigma_{i=1}^{R} n_i = \alpha$, where $\alpha$ is fixed. For example, for R>2, $\alpha=8$, which equals to the maximum of the total number of beams for rank 2 (which corresponds to L=4).

In one example of the number of beams is non-increasing with layers, i.e. $n_1 \geq n_2 \geq \ldots \geq n_R$.

TABLE 2

Possible values of I for different L values

| L | Rank 3 | Rank 4 | Rank 5 | Rank 6 | Rank 7 | Rank 8 |
|---|--------|--------|--------|--------|--------|--------|
| 2 | 3 | 3 | 2 | 1 | 0 | 0 |
| 3 | 2 | 1-3 | 1-2 | 0-1 | 0 | 0 |
| 4 | 0-2 | 0-3 | 0-2 | 0-1 | 0 | 0 |

An example is shown in TABLE 1 and TABLE 2 for R=3-8, and L=2-4. Note that for L=2, there is only for hypothesis/candidate for number of beams (that corresponds to Alt 3-1), and for L=3-4, there are multiple hypotheses/candidates which are indicated by index I. The index I is determined according to at least one of the following alternatives.

In one example of Alt 3-2-1, only one index I is supported. In one instance, example, L=2: I=3 for rank 3-4. In another instance, L=3: I=2 for rank 3 and I=3 for rank 4. In yet another instance, L=4: I=2 for rank 3 and I=3 for rank 4.

In one example of Alt 3-2-2, a UE reports a preferred index I. In such example, this reporting is in a WB manner either jointly with another WB PMI index (e.g., $i_{1,3,1}$) or as a new WB PMI (e.g., $i_{1,5,1}$). In another example, this reporting is per SB either jointly with another SB PMI index (e.g., $i_{2,1,1}$) or as a new SB PMI (e.g., $i_{2,3,1}$).

In one example of Alt 3-2-3, the index I is configured (e.g., via higher-layer RRC signaling) either jointly with another higher-layer parameter (e.g., L) or as a new higher-layer parameter (e.g., beamAllocation).

In a variation, the set of candidates/hypotheses for number of beams is a subset of all possible candidates. Such a subset can be fixed or higher-layer configured. An example is as follows in which the subset comprises at most two hypotheses.

In one example, L=3: I=2 for rank 3 and I={2, 3} for rank 4. In another example, L=4: I={1, 2} for rank 3 and I={2, 3} for rank 4.

In one sub-embodiment 3-3, a UE reports the indices of the $n_i$ beams for layer i according to at least one of the following alternatives.

In one example of Alt 3-3-1: the UE selects (and reports) L beams according to either Alt 2-1-2, Alt 2-2-2 or Alt 2-3, and then, for layer i, selects (and reports) M=$n_i$ beams out of the L selected beams. In an example, the PMI index $i_{1,1}$

TABLE 1

A number of beams across layers assuming α = 8

| Rank | Index (I) | Layer 1 | Layer 2 | Layer 3 | Layer 4 | Layer 5 | Layer 6 | Layer 7 | Layer 8 |
|------|-----------|---------|---------|---------|---------|---------|---------|---------|---------|
| 3 | 0 | 4 | 3 | 1 | | | | | |
|   | 1 | 4 | 2 | 2 | | | | | |
|   | 2 | 3 | 3 | 2 | | | | | |
|   | 3 | 2 | 2 | 2 | | | | | |
| 4 | 0 | 4 | 2 | 1 | 1 | | | | |
|   | 1 | 3 | 3 | 1 | 1 | | | | |
|   | 2 | 3 | 2 | 2 | 1 | | | | |
|   | 3 | 2 | 2 | 2 | 2 | | | | |
| 5 | 0 | 4 | 1 | 1 | 1 | 1 | | | |
|   | 1 | 3 | 2 | 1 | 1 | 1 | | | |
|   | 2 | 2 | 2 | 2 | 1 | 1 | | | |
| 6 | 0 | 3 | 1 | 1 | 1 | 1 | 1 | | |
|   | 1 | 2 | 2 | 1 | 1 | 1 | 1 | | |
| 7 | 0 | 2 | 1 | 1 | 1 | 1 | 1 | 1 | |
| 8 | 0 | 1 | 1 | 1 | 1 | 1 | 1 | 1 | 1 | indicates the orthogonal DFT basis, the PMI index $i_{1,2,0}$ indicates the L beams, and the PMI indices $i_{1,2,1}$, $i_{1,2,2}, \ldots, i_{1,2,v}$ indicate $M=n_i$ beams selected for layers 1, 2, ..., R, respectively.

In one example of Alt 3-3-2, for layer i, the UE selects (and reports) $M=n_i$ beams directly according to either Alt 2-1-1 or Alt 2-2-1. In an example, the PMI index $i_{1,1}$ indicates the orthogonal DFT basis, and the PMI indices $i_{1,2,1}, i_{1,2,2}, \ldots, i_{1,2,v}$ indicate $M=n_i$ beams selected for layers 1, 2, ..., R, respectively.

In one embodiment 4, a UE is configured (via higher layer signaling) to report high-resolution (e.g., Type II) CSI wherein the codebook to report the Type II CSI is dual-stage W=W1W2 in which the second-stage (W2) selects coefficients (e.g., WB amplitude coefficient $p_{l,i}^{(1)}$, SB amplitude coefficient $p_{l,i}^{(2)}$, or/and SB phase coefficient $\varphi_{l,i}$) for linear combination/sum according to at least one of the following alternatives.

In one example of Alt 4-1, the number of coefficients for LC is the same across layers. This implies that the payload (number of bits) to report the coefficients is the same for each layer.

In one example of Alt 4-2, the number of coefficients for LC can be different across layers. This implies that the payload (number of bits) to report the coefficients can vary across layers. Note that the number of beams for LC can be different for the two antenna polarizations (i.e., the number of terms in each of the two summations in Equation 1 can be different).

In one sub-embodiment 4-1, if $L \leq a$, then the number of coefficients for LC is according to Alt 4-1, and if $L > a$, then it is according to Alt 4-2. For example, for rank 3-4 Type II CSI reporting, if L=2, then the number of coefficients for LC is according to Alt 4-1, and if L>2 (e.g., 3-4), then it is according to Alt 4-2.

Let $m_i$ be the number of coefficients for LC to obtain pre-coding vector for layer i.

In one sub-embodiment 4-2, for rank R, the candidates/hypotheses for equal/unequal number of coefficients (according to Alt 4-2) is determined based on the following conditions.

In one example, the total number of coefficients is fixed, i.e., $\Sigma_{i=1}^{R} m_i = \beta$, where $\beta$ is fixed. For example, for R>2, $\beta=14$, which equals to the maximum of the total number of coefficients for rank 2 (which corresponds to L=4).

In one example, the number of coefficients is non-increasing with layers, i.e. $m_1 \geq m_2 \geq \ldots \geq m_R$.

TABLE 3

A number of coefficients across layers assuming $\beta = 14$

| Rank | Index (I) | Layer 1 | Layer 2 | Layer 3 | Layer 4 |
|---|---|---|---|---|---|
| 3 | 0 | 7 | 6 | 1 | |
| | 1 | 7 | 5 | 2 | |
| | 2 | 6 | 6 | 2 | |
| | 3 | 7 | 4 | 3 | |
| | 4 | 6 | 5 | 3 | |
| | 5 | 6 | 4 | 4 | |
| | 6 | 5 | 5 | 4 | |
| | 7 | 3 | 3 | 3 | |
| 4 | 0 | 7 | 5 | 1 | 1 |
| | 1 | 6 | 6 | 1 | 1 |
| | 2 | 7 | 4 | 2 | 1 |
| | 3 | 6 | 5 | 2 | 1 |
| | 4 | 7 | 3 | 3 | 1 |
| | 5 | 6 | 4 | 3 | 1 |
| | 6 | 5 | 5 | 3 | 1 |
| | 7 | 5 | 4 | 4 | 1 |

TABLE 3-continued

A number of coefficients across layers assuming $\beta = 14$

| Rank | Index (I) | Layer 1 | Layer 2 | Layer 3 | Layer 4 |
|---|---|---|---|---|---|
| | 8 | 7 | 3 | 2 | 2 |
| | 9 | 6 | 4 | 2 | 2 |
| | 10 | 5 | 5 | 2 | 2 |
| | 11 | 6 | 3 | 3 | 2 |
| | 12 | 5 | 4 | 3 | 2 |
| | 13 | 4 | 4 | 4 | 2 |
| | 14 | 5 | 3 | 3 | 3 |
| | 15 | 4 | 4 | 3 | 3 |
| | 16 | 3 | 3 | 3 | 3 |

TABLE 4

Possible values of I for different L values

| L | Rank 3 | Rank 4 |
|---|---|---|
| 2 | 7 | 16 |
| 3 | 6 | 6, 7, 10, 12-15 |
| 4 | 0-6 | 0-15 |

An example is shown in TABLE 3 and TABLE 4 for R=3-4, and L=2-4. Note that for L=2, there is only for hypothesis/candidate for number of coefficients (that corresponds to Alt 4-1), and for L=3-4, there are multiple hypotheses/candidates which are indicated by index I. The index I is determined according to at least one of the following alternatives.

In one example of Alt 4-2-1, only one index I is supported. For example, L=2: I=7 rank 3 and I=16 for rank 4, L=3: I=6 for rank 3 and I=15 for rank 4, and L=4: I=6 for rank 3 and I=15 for rank 4.

In one example of Alt 4-2-2, a UE reports a preferred index I. In one example, this reporting is in a WB manner either jointly with another WB PMI index (e.g., $i_{1,3,1}$) or as a new WB PMI (e.g., $i_{1,5,1}$). In another example, this reporting is per SB either jointly with another SB PMI index (e.g., $i_{2,1,1}$) or as a new SB PMI (e.g., $i_{2,3,1}$).

In one example of Alt 4-2-3, the index I is configured (e.g., via higher-layer RRC signaling) either jointly with another higher-layer parameter (e.g., L) or as a new higher-layer parameter (e.g., coefficientAllocation).

In a variation, the set of candidates/hypotheses for number of coefficients is a subset of all possible candidates. Such a subset can be fixed or higher-layer configured. An example is as follows in which the subset comprises at most 8 hypotheses.

In one example, L=3: I=6 for rank 3 and I={6, 7, 10, 12-15} for rank 4. In another example, L=4: I={0-6} for rank 3 and I={8-15} for rank 4.

Another example is shown in TABLE 5 and TABLE 6 for R=5-8, and L=2-4. If multiple candidate/hypotheses are possible, then one of them is determined according to at least one of Alt 4-2-1, 4-2-2, and 4-2-3.

TABLE 5

| | A number of coefficients across layers assuming β = 14 | | | | | | | |
|---|---|---|---|---|---|---|---|---|
| Rank | Index (I) | Layer 1 | Layer 2 | Layer 3 | Layer 4 | Layer 5 | Layer 6 | Layer 7 | Layer 8 |
| 5 | 0 | 7 | 4 | 1 | 1 | 1 | | | |
| | 1 | 6 | 5 | 1 | 1 | 1 | | | |
| | 2 | 7 | 3 | 2 | 1 | 1 | | | |
| | 3 | 6 | 4 | 2 | 1 | 1 | | | |
| | 4 | 5 | 5 | 2 | 1 | 1 | | | |
| | 5 | 6 | 3 | 3 | 1 | 1 | | | |
| | 6 | 5 | 4 | 3 | 1 | 1 | | | |
| | 7 | 4 | 4 | 4 | 1 | 1 | | | |
| | 8 | 7 | 2 | 2 | 2 | 1 | | | |
| | 9 | 6 | 3 | 2 | 2 | 1 | | | |
| | 10 | 5 | 4 | 2 | 2 | 1 | | | |
| | 11 | 5 | 3 | 3 | 2 | 1 | | | |
| | 12 | 4 | 4 | 3 | 2 | 1 | | | |
| | 13 | 4 | 3 | 3 | 3 | 1 | | | |
| | 14 | 6 | 2 | 2 | 2 | 2 | | | |
| | 15 | 5 | 3 | 2 | 2 | 2 | | | |
| | 16 | 4 | 4 | 2 | 2 | 2 | | | |
| | 17 | 4 | 3 | 3 | 2 | 2 | | | |
| | 18 | 3 | 3 | 3 | 3 | 2 | | | |
| 6 | 0 | 7 | 3 | 1 | 1 | 1 | 1 | | |
| | 1 | 6 | 4 | 1 | 1 | 1 | 1 | | |
| | 2 | 5 | 5 | 1 | 1 | 1 | 1 | | |
| | 3 | 7 | 2 | 2 | 1 | 1 | 1 | | |
| | 4 | 6 | 3 | 2 | 1 | 1 | 1 | | |
| | 5 | 5 | 4 | 2 | 1 | 1 | 1 | | |
| | 6 | 5 | 3 | 3 | 1 | 1 | 1 | | |
| | 7 | 4 | 4 | 3 | 1 | 1 | 1 | | |
| | 8 | 6 | 2 | 2 | 2 | 1 | 1 | | |
| | 9 | 5 | 3 | 2 | 2 | 1 | 1 | | |
| | 10 | 4 | 4 | 2 | 2 | 1 | 1 | | |
| | 11 | 4 | 3 | 3 | 2 | 1 | 1 | | |
| | 12 | 3 | 3 | 3 | 3 | 1 | 1 | | |
| | 13 | 5 | 2 | 2 | 2 | 2 | 1 | | |
| | 14 | 4 | 3 | 2 | 2 | 2 | 1 | | |
| | 15 | 3 | 3 | 3 | 2 | 2 | 1 | | |
| | 16 | 4 | 2 | 2 | 2 | 2 | 2 | | |
| | 17 | 3 | 3 | 2 | 2 | 2 | 2 | | |
| 7 | 0 | 7 | 2 | 1 | 1 | 1 | 1 | 1 | |
| | 1 | 6 | 3 | 1 | 1 | 1 | 1 | 1 | |
| | 2 | 5 | 4 | 1 | 1 | 1 | 1 | 1 | |
| | 3 | 6 | 2 | 2 | 1 | 1 | 1 | 1 | |
| | 4 | 5 | 3 | 2 | 1 | 1 | 1 | 1 | |
| | 5 | 4 | 4 | 2 | 1 | 1 | 1 | 1 | |
| | 6 | 4 | 3 | 3 | 1 | 1 | 1 | 1 | |
| | 7 | 5 | 2 | 2 | 2 | 1 | 1 | 1 | |
| | 8 | 4 | 3 | 2 | 2 | 1 | 1 | 1 | |
| | 9 | 3 | 3 | 3 | 2 | 1 | 1 | 1 | |
| | 10 | 4 | 2 | 2 | 2 | 2 | 1 | 1 | |
| | 11 | 3 | 3 | 2 | 2 | 2 | 1 | 1 | |
| | 12 | 3 | 2 | 2 | 2 | 2 | 2 | 1 | |
| | 13 | 2 | 2 | 2 | 2 | 2 | 2 | 2 | |
| 8 | 0 | 7 | 1 | 1 | 1 | 1 | 1 | 1 | 1 |
| | 1 | 6 | 2 | 1 | 1 | 1 | 1 | 1 | 1 |
| | 2 | 5 | 3 | 1 | 1 | 1 | 1 | 1 | 1 |
| | 3 | 4 | 4 | 1 | 1 | 1 | 1 | 1 | 1 |
| | 4 | 5 | 2 | 2 | 1 | 1 | 1 | 1 | 1 |
| | 5 | 4 | 3 | 2 | 1 | 1 | 1 | 1 | 1 |
| | 6 | 3 | 3 | 3 | 1 | 1 | 1 | 1 | 1 |
| | 7 | 4 | 2 | 2 | 2 | 1 | 1 | 1 | 1 |
| | 8 | 3 | 3 | 2 | 2 | 1 | 1 | 1 | 1 |
| | 9 | 3 | 2 | 2 | 2 | 2 | 1 | 1 | 1 |
| | 10 | 2 | 2 | 2 | 2 | 2 | 2 | 1 | 1 |

TABLE 6

Possible values of I for different L values

| L | Rank 5 | Rank 6 | Rank 7 | Rank 8 |
|---|--------|--------|--------|--------|
| 2 | 18 | 12, 15, 17 | 9, 11-13 | 6, 8-10 |
| 3 | 4, 6-7, 10-13, 15-18 | 2, 5-7, 9-17 | 2, 4-13 | 2-10 |
| 4 | 0-18 | 0-17 | 0-13 | 0-10 |

In one sub-embodiment 4-3, the UE reports the indices of the $m_i$ coefficients for layer i according to at least one of the following alternatives.

In one example of Alt 4-3-1, the UE selects (and reports) L beams according to either Alt 2-1-2, Alt 2-2-2 or Alt 2-3, and then, for layer i, selects (and reports) $m_i$ coefficients out of the 2L coefficients. In an example, the PMI index $i_{1,1}$ indicates the orthogonal DFT basis, the PMI index $i_{1,2}$ (or $i_{1,2,0}$) indicates the L beams, and the PMI indices $i_{1,3,1}$, $i_{1,3,2}$, ..., $i_{1,3,v}$ (or $i_{1,2,1}$, $i_{1,2,2}$, ..., $i_{1,2,v}$) indicate $m_i$ coefficients selected for layers 1, 2, ..., R, respectively.

In one example of Alt 4-3-2, for layer i, the UE selects (and reports) $m_i$ coefficients directly out of $2N_1N_2$ coefficients (similar to either Alt 2-1-1 or Alt 2-2-1). In an example, the PMI index $i_{1,1}$ indicates the orthogonal DFT basis, and the PMI indices $i_{1,2,1}$, $i_{1,2,2}$, ..., $i_{1,2,v}$ (or $i_{1,3,1}$, $i_{1,3,2}$, ... $i_{1,3,v}$) indicate $n_i$ coefficients selected for layers 1, 2, ..., R, respectively.

In one embodiment A, which is a variation of embodiment 1/2/3/4, a UE is configured with higher layer parameter CodebookType set to "TypeII-portselection" for Type II CSI reporting with port selection in which the pre-coding vector for layer l is given by $$W^l = \frac{1}{\sqrt{\sum_{i=0}^{2L-1}(p_{l,i}^{(1)}p_{l,i}^{(2)})^2}} \begin{bmatrix} \sum_{i=0}^{L-1} v_{i_{1,1}d+i}p_{l,i}^{(1)}p_{l,i}^{(2)}\varphi_{l,i} \\ \sum_{i=0}^{L-1} v_{i_{1,1}d+i}p_{l,i+L}^{(1)}p_{l,i+L}^{(2)}\varphi_{l,i} \end{bmatrix},$$

where $p_{l,i}^{(1)}$, $p_{l,i}^{(2)}$, and $\varphi_{l,i}$ as defined above, and $v_m$ is a $P_{CSI-RS}/2$-element column vector containing a value of 1 in element (m mod $P_{CSI-RS}/2$) and zeros elsewhere (where the first element is element 0). The vector $v_m$ is a selection vector which selects 1 out of $P_{CSI-RS}/2$ antenna ports, where $P_{CSI-RS}$ is the number of CSI-RS port. If the antenna ports are dual-polarized, then $v_m$ selects a dual-polarized antenna port pair. For each layer, the L antenna ports per polarization are selected by the index $i_{1,1}=q_1$, where $$q_1 \in \left\{0, 1, \ldots, \left\lceil \frac{P_{CSI-RS}}{2d} \right\rceil - 1\right\} \text{(this requires } \left\lceil \log_2 \left\lceil \frac{P_{CSI-RS}}{2d} \right\rceil \right\rceil \text{ bits)},$$

and the value of d is configured with the higher layer parameter PortSelectionSamplingSize, where $d \in \{1, 2, 3, 4\}$ and $$d \leq \min\left(\frac{P_{CSI-RS}}{2}, L\right).$$

So, for a given layer, 2L antenna ports are selected.

All embodiments (e.g., 1/2/3/4), sub-embodiments, alternatives, and examples of the present disclosure (that are descried earlier) can be extended to this port selection case by replacing the beam selection ($v_{m_1^{(i)},m_2^{(i)}}$ in equation (1)) with port selection ($V_{i_{1,1}d+i}$ in equation (2)). In particular, the extension of embodiment 2 wherein the port selection $V_{i_{1,1}d+i}$ is either layer-specific (Alt 2-1) or layer-pair-specific (Alt 2-2) or layer-common (Alt 2-3). Likewise, the extension of embodiment 3 wherein the selected ports are linearly combined according to either equal number of ports per layer (Alt 3-1) or unequal number of ports per layer (Alt 3-2). Likewise, the extension of embodiment 4 wherein the selected ports are linearly combined according to either equal number of coefficients per layer (Alt 3-1) or unequal number of coefficients per layer (Alt 3-2). The details of embodiment 2/3/4 are directly applicable to this port selection case.

The aforementioned embodiments are applicable to an extension of Type II CSI reporting in which linear combination based Type II CSI reporting framework (considered above) is extended to include frequency dimension in addition to the 1st and 2nd antenna port dimensions. In this extension, a UE is configured with high-resolution (e.g., Type II) CSI reporting in which the linear combination based Type II CSI reporting framework is extended to include frequency dimension in addition to the 1st and 2nd antenna port dimensions.

Figure 13:
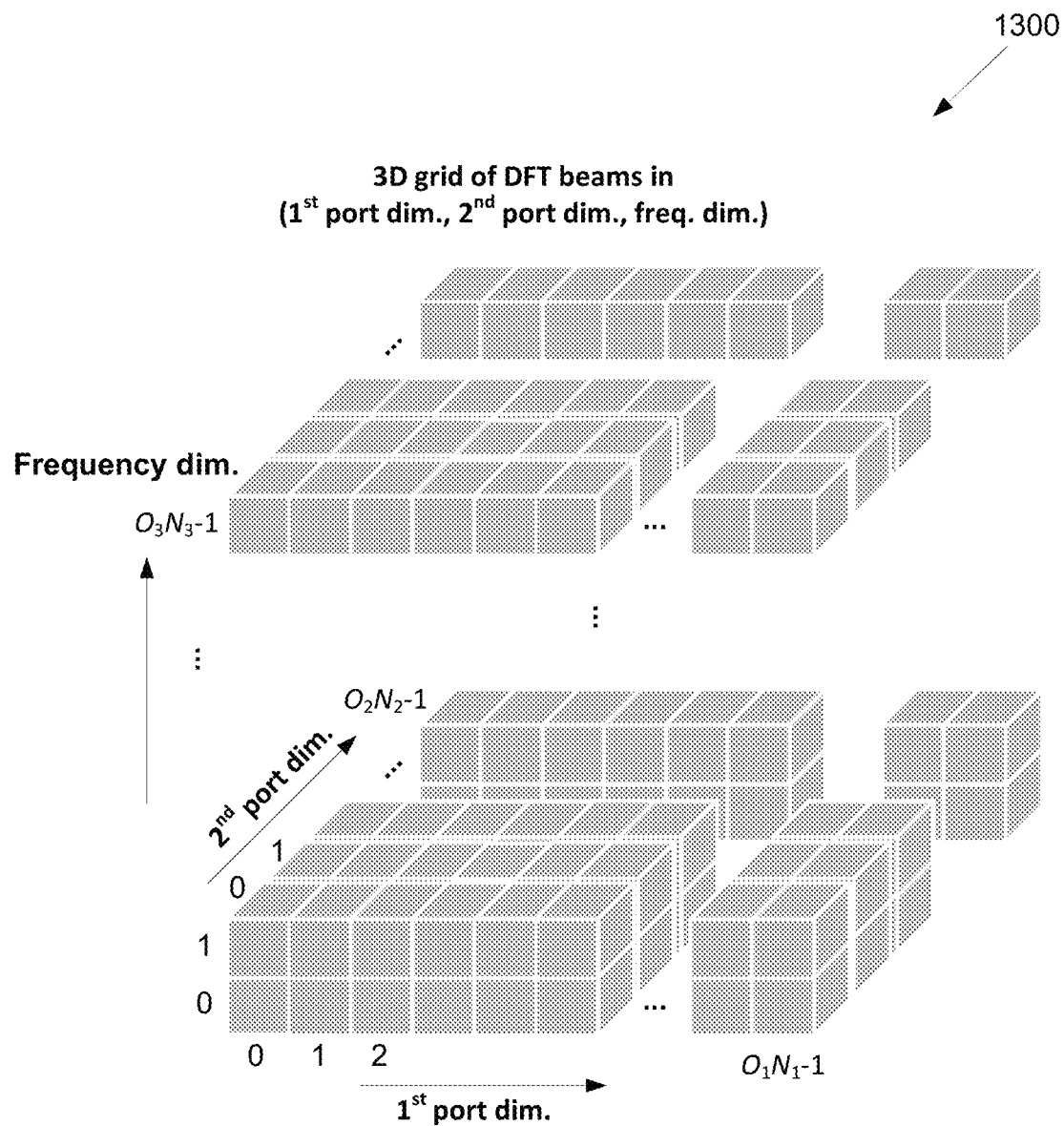
FIG. 13 illustrates an example 3D grid of DFT beams according to embodiments of the present disclosure.

FIG. 13 illustrates an example 3D grid of DFT beams 1300 according to embodiments of the present disclosure. The embodiment of the 3D grid of DFT beams 1300 illustrated in FIG. 13 is for illustration only. FIG. 13 does not limit the scope of the present disclosure to any particular implementation.

An illustration of the 3D grid of the oversampled DFT beams (1st port dim., 2nd port dim., freq. dim.) is shown in FIG. 13 in which: 1st dimension is associated with the 1st port dimension; 2nd dimension is associated with the 2nd port dimension; and 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_i$ belongs to {2, 4, 8}. In yet another example, at least one of $O_1$, $O_2$, and $O_3$ is higher layer configured (via RRC signaling).

A UE is configured with higher layer parameter CodebookType set to "TypeII-Compression" or "TypeIII" for an enhanced Type II CSI reporting in which the pre-coders for all SBs and for a given layer l=1, ..., v, where v is the associated RI value, is given by either:

$$W^l = AC_l B^H = \begin{bmatrix} a_0 & a_1 & \cdots & a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} \begin{bmatrix} b_0 & b_1 & \cdots & b_{M-1} \end{bmatrix}^H =$$

$$\sum_{m=0}^{M-1} \sum_{i=0}^{L-1} c_{l,i,m} (a_i b_m^H) = \sum_{i=0}^{L-1} \sum_{m=0}^{M-1} c_{l,i,k} (a_i b_m^H),$$  Equation 1 or $$W^l = \begin{bmatrix} A & 0 \\ 0 & A \end{bmatrix} C_l B^H =$$  Equation 2

$$\begin{bmatrix} a_0 a_1 \cdots a_{L-1} & 0 \\ 0 & a_0 a_1 \cdots a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} \begin{bmatrix} b_0 & b_1 & \cdots & b_{M-1} \end{bmatrix}^H =$$

$$\begin{bmatrix} \sum_{m=0}^{M-1} \sum_{i=0}^{L-1} c_{l,i,m}(a_i b_m^H) \\ \sum_{m=0}^{M-1} \sum_{i=0}^{L-1} c_{l,i+L,m}(a_i b_m^H) \end{bmatrix}$$

In equations (1) and (2), $N_1$ is a number of antenna ports in a first antenna port dimension; $N_2$ is a number of antenna ports in a second antenna port dimension; $N_3$ is a number of SBs or frequency domain units for PMI reporting (that comprise the CSI reporting band); $a_i$ is a $2N_1N_2 \times 1$ (Eq. 1) or $N_1N_2 \times 1$ (Eq. 2) column vector; $b_k$ is a $N_3 \times 1$ column vector; and $C_{l,i,k}$ is a complex coefficient.

In a variation, when reports a subset K<2LM coefficients (where K is either fixed, configured by the gNB or reported by the UE), then the coefficient $c_{l,i,m}$ in precoder equations Eq. 1 or Eq. 2 is replaced with $v_{l,i,k} \times c_{l,i,m}$, where: $v_{l,i,m}=1$ if the coefficient $c_{l,i,m}$ is reported by the UE according to some embodiments of the present disclosure; and $v_{l,i,m}=0$ otherwise (i.e., $c_{l,i,m}$ is not reported by the UE).

The indication whether $v_{l,i,m}=1$ or 0 is based on a bitmap of length 2LM. In a variation, the precoder equations Eq. 1 or Eq. 2 are respectively generalized to:

$$W^l = \sum_{i=0}^{L-1} \sum_{m=0}^{M_i-1} c_{l,i,m}(a_i b_{i,m}^H)$$  Equation 3 and $$W^l = \begin{bmatrix} \sum_{i=0}^{L-1} \sum_{m=0}^{M_i-1} c_{l,i,m}(a_i b_{i,m}^H) \\ \sum_{i=0}^{L-1} \sum_{m=0}^{M_i-1} c_{l,i+L,m}(a_i b_m^H) \end{bmatrix},$$  Equation 4

In equations (3) and (4), for a given i, the number of basis vectors is $M_i$ and the corresponding basis vectors are $\{b_{i,m}\}$. Note that $M_i$ is the number of coefficients $C_{l,i,m}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $$W^{(R)} = \frac{1}{\sqrt{R}} \begin{bmatrix} W^1 & W^2 & \cdots & W^R \end{bmatrix}.$$

Eq. 2 is assumed in the rest of the disclosure. The embodiments of the disclosure, however, are general and are also application to Eq. 1, Eq. 3, and Eq. 4.

Here $L \leq 2N_1N_2$ and $K \leq N_3$. If $L=2N_1N_2$, then A is an identity matrix, and hence not reported. Likewise, if $K=N_3$, then B is an identity matrix, and hence not reported. Assuming $L<2N_1N_2$, in an example, to report columns of A, the oversampled DFT codebook is used. For instance, $a_i=v_{l,m}$, where the quantity $v_{l,m}$ is given by:

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}.$$

$$v_{l,m} = \begin{bmatrix} 1 & e^{j\frac{2\pi l}{O_1 N_1}} & \cdots & e^{j\frac{2\pi l(N-1)}{O_1 N_1}} & u_m \end{bmatrix}^T$$

Similarly, assuming $K<N_3$, in an example, to report columns of B, the oversampled DFT codebook is used. For instance, $b_k=w_k$, where the quantity $w_k$ is given by $$w_k = \begin{bmatrix} 1 & e^{j\frac{2\pi k}{O_3 N_3}} & \cdots & e^{j\frac{2\pi k(N_2-1)}{O_3 N_3}} \end{bmatrix}.$$

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, n = 0 \\ \sqrt{\frac{2}{K}} \cos\frac{\pi(2m+1)n}{2K}, n = 1, \ldots K-1 \end{cases},$$

and $K = N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

Also, in an alternative, for reciprocity-based Type II CSI reporting, a UE is configured with higher layer parameter CodebookType set to "TypeII-PortSelection-Compression" or "TypeIII-PortSelection" for an enhanced Type II CSI reporting with port selection in which the pre-coders for all SBs and for a given layer l=1, . . . , v, where v is the associated RI value, is given by $W^l = AC_l B^H$, where $N_1$, $N_2$, $N_3$, and $c_{l,i,k}$ are defined as above except that the matrix A comprises port selection vectors.

For instance, the L antenna ports per polarization or column vectors of A are selected by the index $q_1$, where $$q_1 \in \left\{0, 1, \ldots, \left\lceil\frac{P_{CSI-RS}}{2d}\right\rceil - 1\right\} \left(\text{this requires}\left\lceil\log_2\left\lceil\frac{P_{CSI-RS}}{2d}\right\rceil\right\rceil \text{bits}\right),$$

and the value of d is configured with the higher layer parameter PortSelectionSamplingSize, where $d \in \{1,2,3,4\}$ and $$d \leq \min\left(\frac{P_{CSI-RS}}{2}, L\right).$$

To report columns of A, the port selection vectors are used, For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0).

On a high level, a precoder $W^l$ can be described as given by:

$$W = AC_l B^H = W_1 \tilde{W}_2 W_f^H \quad \text{Equation (5)}$$

where $A = W_1$ corresponds to the $W_1$ in Type II CSI codebook, and $B = W_f$. The $C = \tilde{W}_2$ matrix consists of all the required linear combination coefficients (e.g., amplitude and phase or real or imaginary).

The aforementioned embodiments (e.g., embodiments 1-4 and embodiment A) are applicable to this Type II CSI extension in frequency domain (FD). In particular, embodiments 2-4 and embodiment A respectively are extended to embodiments 2X-4X and embodiment AX which are explained below.

In one embodiment 2X, a UE is configured (via higher layer signaling) to report high-resolution (aka Type II) CSI wherein the codebook to report the Type II CSI is triple-stage $W = W_1 \tilde{W}_2 W_f^H$ in which the first-stage (W1) selects antenna port or spatial domain (SD) basis vectors or beams (e.g., DFT beams $v_{m_1^{(i)}, m_2^{(i)}}$) for linear combination/sum (LC) according to at least one of the following alternatives, or sub-alternatives, or examples in embodiment 2, and the third-stage (Wf) selects frequency domain (FD) basis vectors or beams (e.g., DFT beams $w_k$) for linear combination/sum (LC) according to at least one of the following alternatives.

In one example of Alt 2X-1 (layer-specific beam selection), for each layer, N FD basis vectors or beams are selected for LC according to at least one of the following sub-alternatives.

In one example of Alt 2X-1-1, N beams are selected from M beams (where M≥N) which are common for all layers, and are selected from an orthogonal DFT basis comprising $N_3$ beams. In an example, the PMI index $i_{1,1}$ indicates the orthogonal DFT basis, the PMI index $i_{1,2,0}$ indicates the M beams, and the PMI indices $i_{1,2,1}, i_{1,2,2}, \ldots, i_{1,2,v}$ indicate N beams selected for layers 1, 2, . . . , R, respectively.

In one example of Alt 2X-1-2, M=N beams are selected from an orthogonal DFT basis comprising $N_3$ beams. In an example, the PMI index $i_{1,1}$ indicates the orthogonal DFT basis, and the PMI indices $i_{1,2,1}, i_{1,2,2}, \ldots, i_{1,2,v}$ indicate N beams selected for layers 1, 2, . . . , v, respectively.

In one example of Alt 2X-1A (layer-specific beam selection), for each layer l, $N_l$ FD basis vectors or beams are selected for LC according to at least one of the following sub-alternatives.

In one example of Alt 2X-1A-1, $N_l$ beams are selected from M beams (where M≥$N_l$) which are common for all layers, and are selected from an orthogonal DFT basis comprising $N_3$ beams. In an example, the PMI index $i_{1,1}$ indicates the orthogonal DFT basis, the PMI index $i_{1,2,0}$ indicates the M beams, and the PMI indices $i_{1,2,1}, i_{1,2,2}, \ldots, i_{1,2,v}$ indicate $N_l$ beams selected for layers 1, 2, . . . , R=v, respectively.

In one example of Alt 2X-1A-2, $N_l$ beams are selected from an orthogonal DFT basis comprising $N_3$ beams. In an example, the PMI index $i_{1,1}$ indicates the orthogonal DFT basis, and the PMI indices $i_{1,2,1}, i_{1,2,2}, \ldots, i_{1,2,v}$ indicate $N_l$ beams selected for layers 1, 2, . . . , R=v, respectively.

In one example of Alt 2X-2 (layer-pair-specific beam selection), for each pair of consecutive layers (i, i+1), N FD basis vectors or beams are selected for LC according to at least one of the following sub-alternatives.

In one example of Alt 2X-2-1, N beams are selected from M beams (where M≥N) which are common for all pairs of consecutive layers, and are selected from an orthogonal DFT basis comprising $N_3$ beams. In an example, the PMI index $i_{1,1}$ indicates the orthogonal DFT basis, the PMI index $i_{1,2,0}$ indicates the M beams, and the PMI indices $$i_{1,2,1}, i_{1,2,2}, \ldots, i_{1,2,\lceil\frac{v}{2}\rceil}$$

indicate N beams selected for layer pairs (1, 2), (3, 4), . . . , respectively.

In one example of Alt 2X-2-2, M=N beams are selected from an orthogonal DFT basis comprising $N_3$ beams. In an example, the PMI index $i_{1,1}$ indicates the orthogonal DFT basis, and the PMI indices $$i_{1,2,1}, i_{1,2,2}, \ldots, i_{1,2,\lceil\frac{v}{2}\rceil}$$

indicate N beams selected for layer pairs (1, 2), (3, 4), . . . , respectively.

In one example of Alt 2X-2A (layer-pair-specific beam selection), for each pair (l) of consecutive layers (i, i+1), $N_l$ FD basis vectors or beams are selected for LC according to at least one of the following sub-alternatives.

In one example of Alt 2X-2A-1, $N_l$ beams are selected from M beams (where $M \geq N_l$) which are common for all pairs of consecutive layers, and are selected from an orthogonal DFT basis comprising $N_3$ beams. In an example, the PMI index $i_{1,1}$ indicates the orthogonal DFT basis, the PMI index $i_{1,2,0}$ indicates the M beams, and the PMI indices $$i_{1,2,1}, i_{1,2,2}, \ldots, i_{1,2,\lceil \frac{v}{2} \rceil}$$

indicate $N_l$ beams selected for layer pairs (1, 2), (3, 4), . . . , respectively.

In one example of Alt 2X-2A-2, $N_l$ beams are selected from an orthogonal DFT basis comprising $N_3$ beams. In an example, the PMI index $i_{1,1}$ indicates the orthogonal DFT basis, and the PMI indices $$i_{1,2,1}, i_{1,2,2}, \ldots, i_{1,2,\lceil \frac{v}{2} \rceil}$$

indicate $N_l$ beams selected for layer pairs (1, 2), (3, 4), . . . , respectively.

In one example of Alt 2X-3 (layer-common beam selection), for all layers, M=N FD basis vectors or beams are selected for LC from an orthogonal DFT basis comprising $N_3$ beams. In an example, the PMI index $i_{1,1}$ indicates the orthogonal DFT basis, and the PMI index $i_{1,2}$ indicates the M beams.

For Alt 2X-1-2, Alt 2X-2-2 and Alt 2X-3, the value M=N is either fixed, or higher layer configured. For Alt 2X-1-1 and Alt 2X-2-1, the value M and N are either fixed, or higher-layer configured. For Alt 2X-1A-1 and Alt 2X-2A-1, the value M and the set of values {N} are either fixed, or higher-layer configured. Alternatively, for Alt 2X-1-1 and Alt 2X-2-1, the value M is higher-layer configured and N is either fixed or reported by the UE. Alternatively, for Alt 2X-1A-1 and Alt 2X-2A-1, the value M is higher-layer configured and the set of values {N} is either fixed or reported by the UE.

In one example, the value N depends on rank. For instance, N decreases with rank. For example, $N=M=\lceil p \times N_{SB} \rceil$ for rank 1-2, $N=\lceil p_1 \times N_{SB} \rceil$ for rank 3-4, and $N=\lceil p_2 \times N_{SB} \rceil$ for rank 5-8, where $p \in \{1/4, 1/2\}$ is higher layer configured, $p_1 \leq p$, and $p_2 \leq p_1$, and $p_1$ and $p_2$ are either fixed (depending on p) or higher layer configured. In another example, $N_{SB}$ is replaced with $$\frac{N_3}{R}$$

where R is higher layer configured from {1, 2}.

In one example, for Alt 2X-1A, and Alt 2X-2A, the set of value $\{N_l\}$ is such that $\Sigma_l N_l = \alpha$ where $\alpha$ is fixed for example, $\alpha = 2 M_{max}$ where $M_{max}$=maximum value of M for rank 2 CSI reporting.

In another example, for Alt 2X-1A, and Alt 2X-2A, the set of value $\{N_l\}$ is such that $\Sigma_l N_l = \alpha$ where $\alpha$ is fixed for example, $\alpha = 2 M_{max}$ where $M_{max}$=maximum value of M for rank 2 CSI reporting; and $N_l \geq N_m$ for l<m.

In another example, for Alt 2X-1A, and Alt 2X-2A, the set of value $\{N_l\}$ is such that $\Sigma_l N_l = \alpha$ where $\alpha$ is fixed for example, $\alpha = 2 M_{max}$ where $M_{max}$=maximum value of M for rank 2 CSI reporting; and $N_l > N_m$ for l<m.

In one sub-embodiment 2X-1, the third-stage (Wf) selects beams based on a combination of the Alt 2X-1, 2X-2, 2X-1A, 2X-2A or/and 2X-3. For example, for a subset of layers (S1), the beam selection is according to Alt X, and for another subset of layers (S2), the beam selection is according to Alt Y. A few examples are as follows.

In one example of Ex 2X-1, S1={1, 2}, S2={3, 4}, X=2X-3, and Y=2X-1 or 2X-1A. In another example of Ex 2X-2, S1={1, 2}, S2={3, 4}, X=2X-1 or 2X-1A, and Y=2X-3. In yet another example of Ex 2X-3, S1={1, 2}, S2={3, 8}, X=2X-3, and Y=2X-1 or 2X-1A. In yet another example of Ex 2X-4, S1={1, 2}, S2={3, 8}, X=2X-1 or 2X-1A, and Y=2X-3.

In one sub-embodiment 2X-2, the third-stage (Wf) selects beams based on the value M. If M≤a, then beam selection is according to Alt 2X-2-2, i.e., M beams are selected for each consecutive layer-pair (i, i+1) independently, and if M>a, then beam selection is according to Alt 2X-3, i.e., beams are selected common for all layers.

In one example, for rank 3-4 Type II CSI reporting, if M=m1, then beam selection is according to Alt 2X-2-2, i.e., M=2 beams are selected for each of layer-pair (1, 2) and (3, 4) independently, and if M=m2, then beam selection is according to Alt 2X-3, i.e., beams are selected common for all layers (1, 2, 3, 4). In one example, m1<m2.

In one embodiment 3X, a UE is configured (via higher layer signaling) to report high-resolution (e.g., Type II) CSI wherein the codebook to report the Type II CSI is triple-stage $W = W_1 \tilde{W}_2 W_f^H$ in which the second-stage ($\tilde{W}_2$) selects coefficients (e.g., first amplitude coefficient $p_{l,i}^{(1)}$, second amplitude coefficient $p_{l,i}^{(2)}$, or/and phase coefficient $\varphi_{l,i}$) for linear combination/sum according to at least one of the following alternatives.

In one example of Alt 3X-1, both number of SD beams (e.g., DFT beams $v_{m_1^{(i)}, m_2^{(i)}}$) and number of FD beams (e.g., DFT beams $w_k$) for LC are the same across layers, and hence the number of coefficients (which equals 2×number of SD beams×number of FD beams) for LC is also the same across layers. This in turn implies that the payload (number of bits) to report the coefficients is the same for each layer.

In one example of Alt 3X-2, either number of beams (e.g., DFT beams $v_{m_1^{(i)}, m_2^{(i)}}$) or number of FD beams (e.g., DFT beams $w_k$) for LC can be different across layers, and hence the number of coefficients (which equals 2×number of beams×number of FD beams) for LC can also be different across layers. This in turn implies that the payload (number of bits) to report the coefficients can vary across layers.

Note that the number of SD beams for LC is assumed to be the same for the two antenna polarizations (i.e., the number of terms in each of the two summations in Equation 1 is assumed to be the same).

In sub-embodiment 3X-1a, if L≤a, then the number of SD beams for LC is according to Alt 3X-1, and if L>a, then it is according to Alt 3X-2. For example, for rank 3-4 Type II CSI reporting, if L=2, then the number of SD beams for LC is according to Alt 3X-1, and if L>2 (e.g., 3-4), then it is according to Alt 3X-2.

In one sub-embodiment 3X-1b, if M≤b, then the number of FD beams for LC is according to Alt 3X-1, and if M>b, then it is according to Alt 3X-2. For example, for rank 3-4 Type II CSI reporting, if M=m1, then the number of beams for LC is according to Alt 3X-1, and if M>m1, then it is according to Alt 3X-2, where m1 is fixed.

In one sub-embodiment 3X-1c, if L≤a and M≤b, then the number of SD beams and the number of FD beams for LC is according to Alt 3X-1, and otherwise, then it is according to Alt 3X-2.

In one sub-embodiment 3X-1d, if LM≤c, then the number of SD beams and the number of FD beams for LC is according to Alt 3X-1, and otherwise, then it is according to Alt 3X-2.

Let $n_i$ be the number of SD beams linearly combined (summed) to obtain pre-coding vector for layer i. Let $m_i$ be the number of FD beams linearly combined (summed) to obtain pre-coding vector for layer i.

In sub-embodiment 3X-2a, for rank R, the candidates/hypotheses for equal/unequal number of beams (according to Alt 3X-2) is determined based on the following conditions.

In one example, the total number of SD beams is fixed, i.e., $\Sigma_{i=1}^{R} n_i = \alpha$, where $\alpha$ is fixed. For example, for R>2, $\alpha=8$, which equals to the maximum of the total number of beams for rank 2 (which corresponds to L=4). Or, for R>2, $\alpha=12$, which equals to the maximum of the total number of beams for rank 2 (which corresponds to L=6).

In one example, the number of SD beams is non-increasing with layers, i.e. $n_1 \geq n_2 \geq \ldots \geq n_R$.

In one sub-embodiment 3X-2b, for rank R, the candidates/hypotheses for equal/unequal number of beams (according to Alt 3X-2) is determined based on the following conditions.

In one example, the total number of FD beams is fixed, i.e., $\Sigma_{i=1}^{R} m_i = \gamma$, where $\gamma$ is fixed. For example, for R>2, $\gamma=2 \times M_{max}$ where $M_{max}$ is the maximum value of number of FD beams (M) for rank 2.

In one example, the number of FD beams is non-increasing with layers, i.e. $m_1 \geq m_2 \geq \ldots \geq m_R$.

In sub-embodiment 3X-2c, for rank R, the candidates/hypotheses for equal/unequal number of beams (according to Alt 3X-2) is determined based on the following conditions.

In one example, the total number of SD beams is fixed, i.e., $\Sigma_{i=1}^{R} n_i = \alpha$, where $\alpha$ is fixed, and the total number of FD beams is fixed, i.e., $\Sigma_{i=1}^{R} m_i = \gamma$, where $\gamma$ is fixed. For example, for R>2, $\alpha = 2 \times L_{max}$, $\gamma = 2 \times M_{max}$ where $L_{max}$ and $M_{max}$ are maximum values of number of SD beams (L) and number of FD beams (M) for rank 2.

In one example, the number of SD beams is non-increasing with layers, i.e. $n_1 \geq n_2 \geq \ldots \geq n_R$.

In one example, the number of FD beams is non-increasing with layers, i.e. $m_1 \geq m_2 \geq \ldots \geq m_R$.

An example of unequal number of SD beams across layers is shown in TABLE 1 and TABLE 2 for R=3-8, and L=2-4. Note that for L=2, there is only for hypothesis/candidate for number of SD beams (that corresponds to Alt 3X-1), and for L=3-4, there are multiple hypotheses/candidates which are indicated by index I. The index I is determined according to at least one of the following alternatives.

In one example of Alt 3X-2-1, only one index I is supported. For example: L=2: I=3 for rank 3-4, L=3: I=2 for rank 3 and I=3 for rank 4, and L=4: I=2 for rank 3 and I=3 for rank 4.

In one example of Alt 3X-2-2, a UE reports a preferred index I. In one example, this reporting is in a WB manner either jointly with another WB PMI index (e.g., $i_{1,3,1}$) or as a new WB PMI (e.g., $i_{1,5,1}$). In another example, this reporting is per SB either jointly with another SB PMI index (e.g., $i_{2,1,1}$) or as a new SB PMI (e.g., $i_{2,3,1}$).

In one example of Alt 3X-2-3, the index I is configured (e.g., via higher-layer RRC signaling) either jointly with another higher-layer parameter (e.g., L) or as a new higher-layer parameter (e.g., spatialBeamAllocation).

In sub-embodiment 3X-2aa, for rank R, the candidates/hypotheses for equal/unequal number of beams (according to Alt 3X-2) is determined based on the following conditions: the total number of SD beams is fixed, i.e., $\Sigma_{i=1}^{R} n_i = \alpha$, where $\alpha$ is fixed. For example, for R>2, $\alpha=4L$, which equals to the maximum of the total number of beams for rank 2, where L is higher layer configured from {2, 4} or {2, 4, 6} or {2, 3, 4}; $n_i \leq 2L$, i.e., for each layer, the number of SD basis vectors is at most equal to that for RI=2; and/or the number of SD beams is non-increasing with layers, i.e. $n_1 \geq n_2 \geq \ldots \geq n_R$.

In sub-embodiment 3X-2bb, for rank R, the candidates/hypotheses for equal/unequal number of beams (according to Alt 3X-2) is determined based on the following conditions: the total number of FD beams is fixed, i.e., $\Sigma_{i=1}^{R} m_i = \gamma$, where $\gamma$ is fixed. For example, for R>2, $\gamma=2M$ where M is higher layer configured, Or $M = \lceil p \times N_{SB} \rceil$ or $\lceil p \times N_3 / R \rceil$, where p, $N_{SB}$, and R are higher-layer configured; $m_i \leq M$, i.e., for each layer, the number of FD basis vectors is at most equal to that for RI=2; and/or the number of FD beams is non-increasing with layers, i.e. $m_1 \geq m_2 \geq \ldots \geq m_R$.

In sub-embodiment 3X-2cc, for rank R, the candidates/hypotheses for equal/unequal number of beams (according to Alt 3X-2) is determined based on the following conditions.

In one example, the total number of SD beams is fixed, i.e., $\Sigma_{i=1}^{R} n_i = \alpha$, where $\alpha$ is fixed. For example, for R>2, $\alpha=4L$, which equals to the maximum of the total number of beams for rank 2, where L is higher layer configured from {2, 4} or {2, 4, 6} or {2, 3, 4}.

In one example, $n_i \leq 2L$, i.e., for each layer, the number of SD basis vectors is at most equal to that for RI=2.

In one example, the number of SD beams is non-increasing with layers, i.e. $n_1 \geq n_2 \geq \ldots \geq n_R$; the total number of FD beams is fixed, i.e., $\Sigma_{i=1}^{R} m_i = \gamma$, where $\gamma$ is fixed. For example, for R>2, $\gamma=2M$ where M is higher layer configured, Or $M = \lceil p \times N_{SB} \rceil$ or $\lceil p \times N_3 / R \rceil$, where p, $N_{SB}$, and R are higher-layer configured.

In one example, $m_i \leq M$, i.e., for each layer, the number of FD basis vectors is at most equal to that for RI=2.

In one example, the number of FD beams is non-increasing with layers, i.e. $m_1 \geq m_2 \geq \ldots \geq m_R$.

Figure 14:
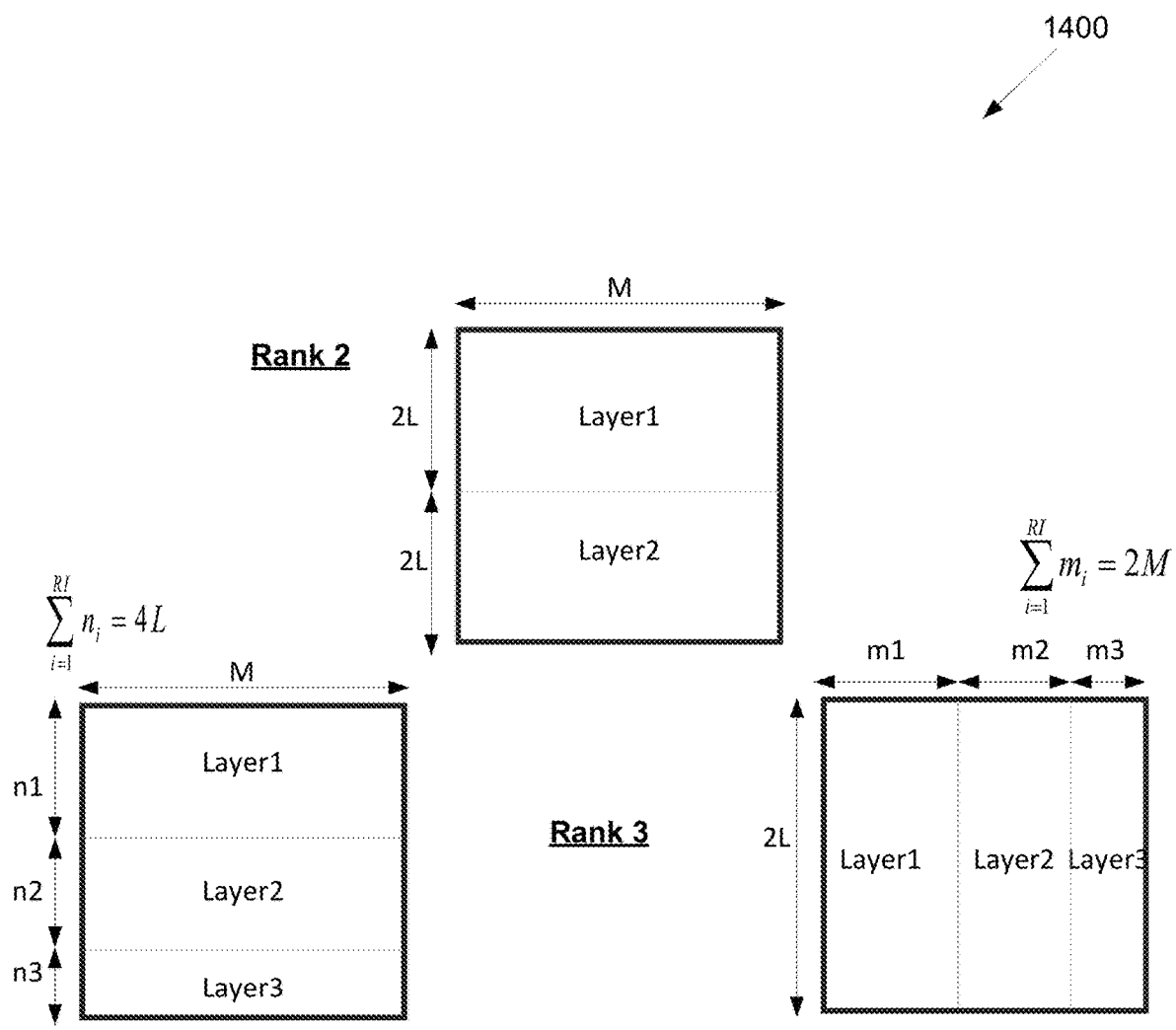
FIG. 14 illustrates an example unequal SD/FD basis subset selection according to embodiments of the present disclosure.

FIG. 14 illustrates an example unequal SD/FD basis subset selection 1400 according to embodiments of the present disclosure. The embodiment of the unequal SD/FD basis subset selection 1400 illustrated in FIG. 14 is for illustration only. FIG. 14 does not limit the scope of the present disclosure to any particular implementation.

The reason that the set $\{n_i\}$ and $\{m_i\}$ comprises non-increasing values as layer i increases is that layers are non-decreasing in strength (since Eigenvalues of dominant eigenvectors are non-increasing), hence, stronger layer may be allocated more number of SD/FD basis vectors. This is illustrated in FIG. 14 for RI=3.

A few example of $\{X_i\}$ and $\{M_i\}$ is shown in TABLE 7 through TABLE 10. The index I (or/and J) indicating $\{n_i\}$ (or/and $\{m_i\}$) is determined according to at least one of the following alternatives.

In one example of Alt 3X-2-a, only one index I (or/and J) is supported.

In one example of Alt 3X-2-b, a UE reports a preferred index I (or/and J).

In one example of Alt 3X-2-c, the index I (or/and J) is configured (e.g., via higher-layer RRC signaling) either jointly with existing higher-layer parameter (e.g., L or p) or as a new higher-layer parameter.

TABLE 7

Examples of {n} and {m_i} for L = 4 and M = 7

| Rank | {$n_i$} | {$m_i$} |
|---|---|---|
| 3 | (6, 6, 4), (7, 5, 4) | (5, 5, 4), (6, 4, 4) |
| 4 | (4, 4, 4, 4), (6, 4, 4, 2), (5, 4, 4, 3), (5, 5, 3, 3) | (4, 4, 4, 2), (5, 4, 3, 2), (5, 3, 3, 3), (4, 4, 3, 3) |

TABLE 8

{$n_i$} for L = 2

| Rank | I | $n_1$ | $n_2$ | $n_3$ | $n_4$ | Rank | I | | | | |
|---|---|---|---|---|---|---|---|---|---|---|---|
| 3 | 0 | 4 | 3 | 1 | | 4 | 0 | 4 | 2 | 1 | 1 |
| | 1 | 4 | 2 | 2 | | | 1 | 3 | 3 | 1 | 1 |
| | 2 | 3 | 3 | 2 | | | 2 | 3 | 2 | 2 | 1 |
| | | | | | | | 3 | 2 | 2 | 2 | 2 |

TABLE 9

{$n_i$} for L = 4

| Rank | I | $n_1$ | $n_2$ | $n_3$ | $n_4$ | Rank | I | | | | |
|---|---|---|---|---|---|---|---|---|---|---|---|
| 3 | 0 | 8 | 7 | 1 | | 4 | 0 | 8 | 6 | 1 | 1 |
| | 1 | 8 | 6 | 2 | | | 1 | 7 | 7 | 1 | 1 |
| | 2 | 7 | 7 | 2 | | | 2 | 8 | 5 | 2 | 1 |
| | 3 | 8 | 5 | 3 | | | 3 | 7 | 6 | 2 | 1 |
| | 4 | 7 | 6 | 3 | | | 4 | 8 | 4 | 3 | 1 |
| | 5 | 8 | 4 | 4 | | | 5 | 7 | 5 | 3 | 1 |
| | 6 | 7 | 5 | 4 | | | 6 | 6 | 6 | 3 | 1 |
| | 7 | 6 | 6 | 4 | | | 7 | 7 | 4 | 4 | 1 |
| | 8 | 6 | 5 | 5 | | | 8 | 6 | 5 | 4 | 1 |
| | | | | | | | 9 | 5 | 5 | 5 | 1 |
| | | | | | | | 10 | 8 | 4 | 2 | 2 |
| | | | | | | | 11 | 7 | 5 | 2 | 2 |
| | | | | | | | 12 | 6 | 6 | 2 | 2 |
| | | | | | | | 13 | 8 | 3 | 3 | 2 |
| | | | | | | | 14 | 7 | 4 | 3 | 2 |
| | | | | | | | 15 | 6 | 5 | 3 | 2 |
| | | | | | | | 16 | 6 | 4 | 4 | 2 |
| | | | | | | | 17 | 5 | 5 | 4 | 2 |
| | | | | | | | 18 | 7 | 3 | 3 | 3 |
| | | | | | | | 19 | 6 | 4 | 3 | 3 |
| | | | | | | | 20 | 5 | 5 | 3 | 3 |
| | | | | | | | 21 | 5 | 4 | 4 | 3 |
| | | | | | | | 22 | 4 | 4 | 4 | 4 |

TABLE 10

{m} for M = 7

| Rank | J | $n_1$ | $n_2$ | $n_3$ | $n_4$ | Rank | J | | | | |
|---|---|---|---|---|---|---|---|---|---|---|---|
| 3 | 0 | 7 | 6 | 1 | | 4 | 0 | 7 | 5 | 1 | 1 |
| | 1 | 7 | 5 | 2 | | | 1 | 6 | 6 | 1 | 1 |
| | 2 | 6 | 6 | 2 | | | 2 | 7 | 4 | 2 | 1 |
| | 3 | 7 | 4 | 3 | | | 3 | 6 | 5 | 2 | 1 |
| | 4 | 6 | 5 | 3 | | | 4 | 7 | 3 | 3 | 1 |
| | 5 | 6 | 4 | 4 | | | 5 | 6 | 4 | 3 | 1 |
| | 6 | 5 | 5 | 4 | | | 6 | 5 | 5 | 3 | 1 |
| | | | | | | | 7 | 5 | 4 | 4 | 1 |
| | | | | | | | 8 | 7 | 3 | 2 | 2 |
| | | | | | | | 9 | 6 | 4 | 2 | 2 |
| | | | | | | | 10 | 5 | 5 | 2 | 2 |
| | | | | | | | 11 | 6 | 3 | 3 | 2 |
| | | | | | | | 12 | 5 | 4 | 3 | 2 |
| | | | | | | | 13 | 4 | 4 | 4 | 2 |

TABLE 10-continued

{m} for M = 7

| Rank | J | $n_1$ | $n_2$ | $n_3$ | $n_4$ | Rank | J |
|---|---|---|---|---|---|---|---|
| | | | | | | 14 | 5 | 3 | 3 | 3 |
| | | | | | | 15 | 4 | 4 | 3 | 3 |

In a variation, the set of candidates/hypotheses for number of SD beams is a subset of all possible candidates. Such a subset can be fixed or higher-layer configured. An example is as follows in which the subset comprises at most two hypotheses: L=3: I=2 for rank 3 and I={2, 3} for rank 4, and L=4: I={1, 2} for rank 3 and I={2, 3} for rank 4.

In one example, M=⌈p×$N_{SB}$⌉, where p∈{¼,½} is higher layer configured. In another example, $N_{SB}$ is replaced with $$\frac{N_3}{R}$$

where R is higher layer configured from {1, 2}. In these example, $M_{max}$ is obtained by choosing the maximum value (denoted by $p_{max}$) of p. Let $p_i$ be the p value to determine the number of FD beams linearly combined (summed) to obtain pre-coding vector for layer i. Hence, the condition $m_1$≥ $m_2$≥ . . . ≥$m_R$ in sub-embodiment 3X-2b/2c implies $p_1$≥ $p_2$≥ . . . ≥$p_R$.

An example of unequal number of FD beams across layers is shown in TABLE 11 and TABLE 12 for R=3-8, and p∈{¼,½}. Note that for p=¼, there is only for hypothesis/candidate for number of FD beams (that corresponds to Alt 3X-1), and for p=½, there are multiple hypotheses/candidates which are indicated by index J. The index J is determined according to at least one of the following alternatives.

In one example of Alt 3X-2-4, only one index J is supported. For example, p=¼: J=3 for rank 3-4, and p=½: J=2 for rank 3 and J=3 for rank 4.

In one example of Alt 3X-2-5, a UE reports a preferred index J. In one example, this reporting is in a WB manner either jointly with another WB PMI index (e.g., $i_{1,3,l}$) or as a new WB PMI (e.g., $i_{1,5,l}$). In another example, this reporting is per SB either jointly with another SB PMI index (e.g., $i_{2,1,l}$) or as a new SB PMI (e.g., $i_{2,3,l}$).

In one example of Alt 3X-2-6, the index J is configured (e.g., via higher-layer RRC signaling) either jointly with another higher-layer parameter (e.g., p) or as a new higher-layer parameter (e.g., freqBeamAllocation).

In a variation, the set of candidates/hypotheses for number of FD beams is a subset of all possible candidates. Such a subset can be fixed or higher-layer configured. An example is as follows in which the subset comprises at most two hypotheses: p=¼: J=2 for rank 3 and J={2,3} for rank 4, and p=½: J={1,2} for rank 3 and J={2,3} for rank 4.

TABLE 11

$p_i$ values across layers assuming $\sum_{i=1}^{R} p_i = 2 \times p_{max} = 1; p_{max} = \frac{1}{2}$

| Rank | Index (I) | Layer 1 | Layer 2 | Layer 3 | Layer 4 | Layer 5 | Layer 6 | Layer 7 | Layer 8 |
|---|---|---|---|---|---|---|---|---|---|
| 3 | 0 | 4/8 = 1/2 | 3/8 | 1/8 | | | | | |
|  | 1 | 1/2 | 1/4 | 1/4 | | | | | |
|  | 2 | 3/8 | 3/8 | 2/8 = 1/4 | | | | | |
|  | 3 | 1/4 | 1/4 | 1/4 | | | | | |
| 4 | 0 | 4/8 = 1/2 | 2/8 = 1/4 | 1/8 | 1/8 | | | | |
|  | 1 | 3/8 | 3/8 | 1/8 | 1/8 | | | | |
|  | 2 | 3/8 | 2/8 = 1/4 | 2/8 = 1/4 | 1/8 | | | | |
|  | 3 | 1/4 | 1/4 | 1/4 | 1/4 | | | | |
| 5 | 0 | 4/8 = 1/2 | 1/8 | 1/8 | 1/8 | 1/8 | | | |
|  | 1 | 3/8 | 2/8 = 1/4 | 1/8 | 1/8 | 1/8 | | | |
|  | 2 | 2/8 = 1/4 | 2/8 = 1/4 | 2/8 = 1/4 | 1/8 | 1/8 | | | |
| 6 | 0 | 3/8 | 1/8 | 1/8 | 1/8 | 1/8 | 1/8 | | |
|  | 1 | 2/8 = 1/4 | 2/8 = 1/4 | 1/8 | 1/8 | 1/8 | 1/8 | | |
| 7 | 0 | 2/8 = 1/4 | 1/8 | 1/8 | 1/8 | 1/8 | 1/8 | 1/8 | |
| 8 | 0 | 1/8 | 1/8 | 1/8 | 1/8 | 1/8 | 1/8 | 1/8 | 1/8 |

TABLE 12

Possible values of J for different p values

| p | Rank 3 | Rank 4 | Rank 5 | Rank 6 | Rank 7 | Rank 8 |
|---|---|---|---|---|---|---|
| 1/4 | 3 | 3 | 2 | 1 | 0 | 0 |
| 1/2 | 0-2 | 0-3 | 0-2 | 0-1 | 0 | 0 |

An example of unequal number of FD beams across layers is shown in TABLE 13 for R=3-4, and $p \in \{1/4, 1/2\}$.

TABLE 13

$p_i$ values across layers assuming $\sum_{i=1}^{R} p_i = 2 \times p_{max} = 1; p_{max} = \frac{1}{2}$

| Rank | Index (I) | Layer 1 | Layer 2 | Layer 3 | Layer 4 |
|---|---|---|---|---|---|
| 3 | 0 | 1/2 | 1/4 | 1/4 | |
|  | 1 | 1/4 | 1/4 | 1/4 | |
| 4 | 0 | 1/4 | 1/4 | 1/4 | 1/4 |

In one sub-embodiment 3X-3, the UE reports the indices of the $n_i$ SD beams for layer i according to at least one of Alt 3-3-1 and Alt 3-3-2 in embodiment 3-3, and reports the indices of the $m_i$ FD beams for layer i according to at least one of the following alternatives.

In one example of Alt 3X-3-1, the UE selects (and reports) M beams according to either Alt 2X-1-2, Alt 2X-2-2 or Alt 2X-3, and then, for layer i, selects (and reports) N=$m_i$ beams out of the M selected beams. In an example, the PMI index $i_{1,1}$ indicates the orthogonal DFT basis, the PMI index $i_{1,2,0}$ indicates the L beams, and the PMI indices $i_{1,2,1}$, $i_{1,2,2}$, ..., $i_{1,2,v}$ indicate N=$m_i$ beams selected for layers 1, 2, ..., R, respectively.

In one example of Alt 3X-3-2, for layer i, the UE selects (and reports) N=$m_i$ beams directly according to either Alt 2X-1-1 or Alt 2X-2-1. In an example, the PMI index $i_{1,1}$ indicates the orthogonal DFT basis, and the PMI indices $i_{1,2,1}$, $i_{1,2,2}$, ..., $i_{1,2,v}$ indicate N=$m_i$ beams selected for layers 1, 2, ..., R, respectively.

In one embodiment 4X, a UE is configured (via higher layer signaling) to report high-resolution (e.g., Type II) CSI wherein the codebook to report the Type II CSI is triple-stage $W = W_1 \tilde{W}_2 W_f^H$ in which the second-stage ($\tilde{W}_2$) selects coefficients (e.g., first amplitude coefficient $p_{l,i}^{(1)}$, second amplitude coefficient $p_{l,i}^{(2)}$, or/and phase coefficient $\varphi_{l,i}$) for linear combination/sum according to at least one of the following alternatives.

In one example of Alt 4X-1, the maximum number of non-zero (NZ) coefficients for LC comprising $\tilde{W}_2$ is the same across layers. This implies that the payload (number of bits) to report the coefficients is the same for each layer.

In one example of Alt 4X-2, the maximum number of NZ coefficients comprising $\tilde{W}_2$ for LC can be different across layers. This implies that the payload (number of bits) to report the coefficients can vary across layers.

Let K be the maximum number of NZ coefficients that can be reported by the UE. The coefficients that are zero are not reported by the UE.

In sub-embodiment 4X-1 a, if L≤a, then the number of coefficients comprising $\tilde{W}_2$ is according to Alt 4X-1, and if L>a, then it is according to Alt 4X-2. For example, for rank 3-4 Type II CSI reporting, if L=2, then the number of coefficients for LC is according to Alt 4X-1, and if L>2 (e.g., 3-4), then it is according to Alt 4X-2.

In one sub-embodiment 4X-1b, if M≤b, then the number of coefficients comprising $\tilde{W}_2$ is according to Alt 4X-1, and if M>b, then it is according to Alt 4X-2. For example, for rank 3-4 Type II CSI reporting, if M=m1, then the number coefficients for LC is according to Alt 4X-1, and if M>m1, then it is according to Alt 4X-2, where m1 is fixed.

In one sub-embodiment 4X-1c, if L≤a and M≤b, then the number of coefficients comprising $\tilde{W}_2$ is according to Alt 4X-1, and otherwise, then it is according to Alt 4X-2.

In one sub-embodiment 4X-1d, if LM≤c, then the number of coefficients comprising $\tilde{W}_2$ is according to Alt 4X-1, and otherwise, then it is according to Alt 4X-2.

Let $k_i$ be the maximum number of NZ coefficients comprising $\tilde{W}_2$ to obtain pre-coding vector for layer i.

In one sub-embodiment 4X-2, for rank R, the candidates/hypotheses for equal/unequal number of coefficients (according to Alt 4-X2) is determined based on the following conditions: the total of the maximum number of NZ coefficients is fixed, i.e., $\sum_{i=1}^{R} k_i = \theta$, where $\theta$ is fixed. For example, for R>2, $\theta = 2 \times K_{max}$, where $K_{max}$ is the maximum value of number of NZ coefficients for rank 1; and/or the maximum number of NZ coefficients is non-increasing with layers, i.e. $k_1 \geq k_2 \geq \ldots \geq k_R$.

In one example, $K = \lceil \beta \times 2LM \rceil$, where $\beta \in \{1/4, 1/2\}$ or $\{1/4, 1/2, 3/4\}$ is higher layer configured. In this example, $K_{max}$ is obtained by choosing the maximum value (denoted by $\beta_{max}$) of $\beta$, e.g., $\beta_{max} = 3/4$. Hence, $K_{max} = \lceil \beta_{max} \times 2LM \rceil$. Let $\beta$ be the $\beta$ value to determine the maximum number of NZ coefficients linearly combined (summed) to obtain pre-coding vector for layer i. Hence, the condition $k_1 \geq k_2 \geq \ldots \geq k_R$ in sub-embodiment 4X-2 implies $\beta_1 \geq \beta_2 \geq \ldots \geq \beta_R$.

TABLE 14

$\beta_i$ values across layers assuming $$\sum_{i=1}^{R} \beta_i = 2 \times \beta_{max} = \frac{3}{2}; p_{max} = \frac{3}{4}$$

| Rank | Index (I) | Layer 1 | Layer 2 | Layer 3 | Layer 4 |
|---|---|---|---|---|---|
| 3 | 0 | 3/4 | 1/2 | 1/4 | |
|   | 1 | 1/2 | 1/2 | 1/2 | |
|   | 2 | 1/4 | 1/4 | 1/4 | |
| 4 | 0 | 3/4 | 1/4 | 1/4 | 1/4 |
|   | 1 | 1/2 | 1/2 | 1/4 | 1/4 |
|   | 2 | 1/4 | 1/4 | 1/4 | 1/4 |

An example of unequal number of coefficients across layers is shown in TALE 14 for R=3-4, and $\beta \in \{1/4, 1/2, 3/4\}$. Note that there is only for hypothesis/candidate for number of coefficients for each value of $\beta_i \in \{1/4, 1/2, 3/4\}$.

In one embodiment 5, when RI=3-4, the UE is configured to select/report a L SD basis vectors common for the two antenna polarizations at the gNB, hence there are 2L SD basis vectors across 2 antenna polarizations. For layer $i \in \{0, 1, \ldots, RI-1\}$, the UE selects $n_i$ SD basis vectors freely (unrestricted) from the selected 2L SD basis vectors, where $n_i \leq 2L$. At least one of the following alternatives (Alt) is used to report the $n_i$ SD basis vectors for all layers $i \in \{0, 1, \ldots, RI-1\}$.

In one embodiment of Alt 5-0, the set of values $\{n_i\}$ is fixed for each RI value, and for each layer i, the indices of $n_i$ selected basis vectors are reported according to at least one of the following alternatives.

In one example of Alt 5-0-0, the indices of $n_i$ selected basis vectors are reported using a bitmap of length 2L. In another example of Alt 5-0-1, the indices of $n_i$ selected basis vectors are reported using a combinatorial index $$x \in \left\{0, 1, \ldots, \binom{2L}{n_i} - 1\right\}.$$

In one embodiment of Alt 5-1, the set of values $\{n_i\}$ is also reported by the UE, and the indices of $n_i$ selected basis vectors are reported according to at least one of the following alternatives.

In one example of Alt 5-1-0, the set of values $\{n_i\}$ and the indices of $n_i$ selected basis vectors are reported jointly using a bitmap. In such example, an independent bitmap (of length 2L) is used for each layer, hence the length of the bitmap is $2L \times RI$.

In one example of Alt 5-1-1, the set of values $\{n_i\}$ and the indices of $n_i$ selected basis vectors are reported independently. In one instance, the set of values $\{n_i\}$ is reported using an index (I) as proposed in some embodiment of the present disclosure, and for each layer i, the indices of $n_i$ selected basis vectors are reported using a bitmap of length 2L. In another instance, the set of values $\{n_i\}$ is reported using an index (I) as proposed in some embodiment of the present disclosure, and for each layer i, the indices of $n_i$ selected basis vectors are reported using a combinatorial index $$x \in \left\{0, 1, \ldots, \binom{2L}{n_i} - 1\right\}.$$

In one embodiment 5A, when RI=3-4, the UE is configured to select/report a 2L SD basis vectors (as in Embodiment 5), order/sort the selected 2L SD basis vectors, and for layer $i \in \{0, 1, \ldots, RI-1\}$, the UE selects $n_i$ SD basis vectors from the ordered/sorted 2L SD basis vectors, where $n_i \leq 2L$. The UE reports the 2L SD basis vectors and their ordering/sorting information either jointly of separately.

In one example, the ordering/sorting of 2L SD basis vectors is in decreasing power level of the 2L SD basis vectors. For layer i, the UE selects the $n_i$ "strongest" basis vectors which corresponds to SD basis vectors the maximum power.

In one embodiment 5B, when RI=3-4, the UE is configured to select/report a 2L SD basis vectors (as in Embodiment 5), and for layer $i \in \{0, 1, \ldots, RI-1\}$, the UE selects $n_i$ SD basis vectors from the selected 2L SD basis vectors as follows, where $n_i \leq 2L$. The UE selects $n_{i,1}$ SD basis vectors for the $1^{st}$ antenna polarization (which corresponds to basis vector index $i=0, 1, \ldots, L-1$), and $n_{i,2}$ SD basis vectors for the $2^{nd}$ antenna polarization (which corresponds to basis vector index $i=L, L+1, \ldots, 2L-1$), where $n_{i,1}, n_{i,2} \leq L$, $n_{i,1} + n_{i,2} = n_i$, and $(n_{i,1}, n_{i,2})$, or $(n_i, n_{i,2})$ or $(n_{i,1}, n_i)$ is either fixed, configured, or reported by the UE. The values $n_{i,1}$ and $n_{i,2}$ are determined according to at least one of the following examples.

In one example of Ex 5B-0, $$n_{i,1} = \left\lceil \frac{n_i}{2} \right\rceil \text{ and } n_{i,2} = n_i - \left\lceil \frac{n_i}{2} \right\rceil.$$

In one example of Ex 5B-1, $$n_{i,1} = \left\lfloor \frac{n_i}{2} \right\rfloor \text{ and } n_{i,2} = n_i - \left\lfloor \frac{n_i}{2} \right\rfloor.$$

In one example of Ex 5B-2, $$n_{i,2} = \left\lceil \frac{n_i}{2} \right\rceil \text{ and } n_{i,1} = n_i - \left\lceil \frac{n_i}{2} \right\rceil.$$

In one example of Ex 5B-3, $$n_{i,2} = \left\lfloor \frac{n_i}{2} \right\rfloor \text{ and } n_{i,1} = n_i - \left\lfloor \frac{n_i}{2} \right\rfloor.$$

In one example of Ex 5B-4, $$n_{i,1} = \left\lceil \frac{n_i}{2} \right\rceil \text{ and } n_{i,2} = n_i - \left\lceil \frac{n_i}{2} \right\rceil$$

if the strongest coefficient indicator SCI) for layer i belong to the $1^{st}$ antenna polarization;

$$n_{i,2} = \left\lceil \frac{n_i}{2} \right\rceil \text{ and } n_{i,1} = n_i - \left\lceil \frac{n_i}{2} \right\rceil,$$

otherwise.

In one example of Ex 5B-5, $$n_{i,1} = \left\lceil \frac{n_i}{2} \right\rceil \text{ and } n_{i,2} = n_i - \left\lceil \frac{n_i}{2} \right\rceil$$

if the strongest coefficient indicator (SCI) for layer i belong to the $2^{nd}$ antenna polarization;

$$n_{i,2} = \left\lceil \frac{n_i}{2} \right\rceil \text{ and } n_{i,1} = n_i - \left\lceil \frac{n_i}{2} \right\rceil,$$

otherwise.

In one example of Ex 5B-6, $$n_{i,1} = \left\lfloor \frac{n_i}{2} \right\rfloor \text{ and } n_{i,2} = n_i - \left\lfloor \frac{n_i}{2} \right\rfloor$$

if the strongest coefficient indicator (SCI) for layer i belong to the $1^{st}$ antenna polarization;

$$n_{i,2} = \left\lfloor \frac{n_i}{2} \right\rfloor \text{ and } n_{i,1} = n_i - \left\lfloor \frac{n_i}{2} \right\rfloor,$$

otherwise.

In one example of Ex 5B-7, $$n_{i,1} = \left\lfloor \frac{n_i}{2} \right\rfloor \text{ and } n_{i,2} = n_i - \left\lfloor \frac{n_i}{2} \right\rfloor$$

if the strongest coefficient indicator (SCI) for layer i belong to the $2^{nd}$ antenna polarization;

$$n_{i,2} = \left\lfloor \frac{n_i}{2} \right\rfloor \text{ and } n_{i,1} = n_i - \left\lfloor \frac{n_i}{2} \right\rfloor,$$

otherwise.

At least one of the following alternatives (Alt) is used to report the $(n_{i,1}, n_{i,2})$ SD basis vectors for all layers $i \in \{0, 1, \ldots, RI-1\}$.

In one embodiment of Alt 5B-0, the set of values $\{(n_{i,1}, n_{i,2})\}$ is fixed for each RI value, and for each layer i, the indices of $(n_i, n_{i,2})$ selected basis vectors are reported according to at least one of the following alternatives.

In one example of Alt 5B-0-0, for each $k \in \{1,2\}$, the indices of $n_{i,k}$ selected basis vectors are reported using a bitmap of length L.

In one example of Alt 5B-0-1, for each $k \in \{1,2\}$, the indices of $n_{i,k}$ selected basis vectors are reported using a combinatorial index $$x \in \left\{ 0, 1, \ldots, \binom{L}{n_{i,k}} - 1 \right\}.$$

In one embodiment of Alt 5B-1, the set of values $\{(n_{i,1}, n_{i,2})\}$ is also reported by the UE, and the indices of $(n_{i,1}, n_{i,2})$ selected basis vectors are reported according to at least one of the following alternatives.

In one example of Alt 5B-1-0, for each $k \in \{1,2\}$, the set of values $\{n_{i,k}\}$ and the indices of $n_{i,k}$ selected basis vectors are reported jointly using a bitmap. In one instance, an independent bitmap (of length L) is used for each layer, hence the length of the bitmap is L×RI.

In one example of Alt 5B-1-1, for each $k \in \{1,2\}$, the set of values $\{n_{i,k}\}$ and the indices of $n_{i,k}$ selected basis vectors are reported independently. In one instance, the set of values $\{n_{i,k}\}$ is reported using an index (I) as proposed in some embodiment of the present disclosure, and for each layer i, the indices of $n_{i,k}$ selected basis vectors are reported using a bitmap of length L. In another instance, the set of values $\{n_{i,k}\}$ is reported using an index (I) as proposed in some embodiment of the present disclosure, and for each layer i, the indices of $n_{i,k}$ selected basis vectors are reported using a combinatorial index $$x \in \left\{ 0, 1, \ldots, \binom{L}{n_{i,k}} - 1 \right\}.$$

In a variation, when RI=3-4, for each antenna polarization $k \in \{1,2\}$, the UE is configured to select/report a L SD basis vectors for all layers, order/sort the selected L SD basis vectors, and for layer $i \in \{0, 1, \ldots, RI-1\}$, for each $k \in \{1, 2\}$, the UE selects $n_{i,k}$ SD basis vectors from the ordered/sorted L SD basis vectors, where $n_{i,k} \leq L$. For each $k \in \{1, 2\}$, the UE reports the L SD basis vectors and their ordering/sorting information either jointly of separately.

In one example, the ordering/sorting of L SD basis vectors is in decreasing power level of the L SD basis vectors. For layer i, the UE selects the $n_{i,k}$ "strongest" basis vectors which corresponds to SD basis vectors the maximum power.

In one embodiment 6, when RI=3-4, the UE is configured to select/report a L SD basis vectors for all layers, and for layer $i \in \{0, 1, \ldots, RI-1\}$, the UE selects $n_i$ SD basis vectors freely (unrestricted) from the selected L SD basis vectors, where $n_i \leq L$. Here, the set of L SD basis vectors is common for the two antenna polarizations at the gNB. Likewise, the set of $n_i$ SD basis vectors for layer i is also common for the two antenna polarizations at the gNB. Therefore, the number of SD basis vectors across two antenna polarizations is $2n_i$. At least one of the following alternatives (Alt) is used to report the $n_i$ SD basis vectors for all layers $i \in \{0, 1, \ldots, RI-1\}$.

In one embodiment of Alt 6-0, the set of values $\{n_i\}$ is fixed for each RI value, and for each layer i, the indices of $n_i$ selected basis vectors are reported according to at least one of the following alternatives.

In one example of Alt 6-0-0, the indices of $n_i$ selected basis vectors are reported using a bitmap of length L.

In one example of Alt 6-0-1, the indices of $n_i$ selected basis vectors are reported using a combinatorial index $$x \in \left\{ 0, 1, \ldots, \binom{L}{n_{i,k}} - 1 \right\}.$$

Note that if $n_i = L$ for any i, then there is no need report the indices of $n_i$ since all L SD beams are selected.

In one embodiment of Alt 6-1, the set of values $\{n_i\}$ is also reported by the UE, and the indices of $n_i$ selected basis vectors are reported according to at least one of the following alternatives.

In one example of Alt 6-1-0, the set of values $\{n_i\}$ and the indices of $n_i$ selected basis vectors are reported jointly using a bitmap. In one instance, an independent bitmap (of length L) is used for each layer, hence the length of the bitmap is L×RI.

In one example of Alt 6-1-1, the set of values $\{n_i\}$ and the indices of $n_i$ selected basis vectors are reported independently. In one instance, the set of values $\{n_i\}$ is reported using an index (I) as proposed in some embodiment of the present disclosure, and for each layer i, the indices of $n_i$ selected basis vectors are reported using a bitmap of length L. In another instance, the set of values $\{n_i\}$ is reported using an index (I) as proposed in some embodiment of the present disclosure, and for each layer i, the indices of $n_i$ selected basis vectors are reported using a combinatorial index $$x \in \left\{0, 1, \ldots, \binom{L}{n_i} - 1\right\}.$$

Note that if $n_i$=L for any i, then there is no need report the indices of $n_i$ since all L SD beams are selected.

In one embodiment 6A, when RI=3-4, the UE is configured to select/report a L SD basis vectors for all layers, order/sort the selected L SD basis vectors, and for layer $i \in \{0, 1, \ldots, RI-1\}$, the UE selects $n_i$ SD basis vectors from the ordered/sorted L SD basis vectors, where $n_i \leq L$. The UE reports the L SD basis vectors and their ordering/sorting information either jointly of separately.

In one example, the ordering/sorting of L SD basis vectors is in decreasing power level of the L SD basis vectors. For layer i, the UE selects the $n_i$ "strongest" basis vectors which corresponds to SD basis vectors the maximum power.

In one embodiment 6B, when RI=3-4, the UE is configured to select/report a L SD basis vectors for all layers, and for layer $i \in \{0, 1, \ldots, RI-1\}$, the UE selects $n_i$ SD basis vectors from the selected L SD basis vectors as follows, where $n_i \leq L$ (or optionally $n_i \leq 2L$). The UE selects $n_{i,1}$ SD basis vectors for the $1^{st}$ antenna polarization (which corresponds to basis vector index i=0, 1, ..., L−1), and $n_{i,2}$ SD basis vectors for the $2^{nd}$ antenna polarization (which corresponds to basis vector index i=L, L+1, ..., 2L−1), where $n_{i,1}, n_{i,2} \leq L$, $n_{i,1} + n_{i,2} = n_i$, and $(n_{i,1}, n_{i,2})$, or $(n_i, n_{i,2})$ or $(n_{i,1}, n_i)$ is either fixed, configured, or reported by the UE. The values $n_{i,1}$ and $n_{i,2}$ are determined according to at least one of the following examples.

In one example of Ex 6B-0, $$n_{i,1} = \left\lceil \frac{n_i}{2} \right\rceil \text{ and } n_{i,2} = n_i - \left\lceil \frac{n_i}{2} \right\rceil.$$

In one example of Ex 6B-1, $$n_{i,1} = \left\lfloor \frac{n_i}{2} \right\rfloor \text{ and } n_{i,2} = n_i - \left\lfloor \frac{n_i}{2} \right\rfloor.$$

In one example of Ex 6B-2, $$n_{i,2} = \left\lceil \frac{n_i}{2} \right\rceil \text{ and } n_{i,1} = n_i - \left\lceil \frac{n_i}{2} \right\rceil.$$

In one example of Ex 6B-3, $$n_{i,2} = \left\lfloor \frac{n_i}{2} \right\rfloor \text{ and } n_{i,1} = n_i - \left\lfloor \frac{n_i}{2} \right\rfloor.$$

In one example of Ex 6B-4, $$n_{i,1} = \left\lceil \frac{n_i}{2} \right\rceil \text{ and } n_{i,2} = n_i - \left\lceil \frac{n_i}{2} \right\rceil$$

if the strongest coefficient indicator (SCI) for layer i belong to the $1^{st}$ antenna polarization;

$$n_{i,2} = \left\lceil \frac{n_i}{2} \right\rceil \text{ and } n_{i,1} = n_i - \left\lceil \frac{n_i}{2} \right\rceil,$$

otherwise.

In one example of Ex 6B-5, $$n_{i,1} = \left\lceil \frac{n_i}{2} \right\rceil \text{ and } n_{i,2} = n_i - \left\lceil \frac{n_i}{2} \right\rceil$$

if the strongest coefficient indicator (SCI) for layer i belong to the $2^{nd}$ antenna polarization;

$$n_{i,2} = \left\lceil \frac{n_i}{2} \right\rceil \text{ and } n_{i,1} = n_i - \left\lceil \frac{n_i}{2} \right\rceil,$$

otherwise.

In one example of Ex 6B-6, $$n_{i,1} = \left\lfloor \frac{n_i}{2} \right\rfloor \text{ and } n_{i,2} = n_i - \left\lfloor \frac{n_i}{2} \right\rfloor$$

if the strongest coefficient indicator (SCI) for layer i belong to the $1^{st}$ antenna polarization;

$$n_{i,2} = \left\lfloor \frac{n_i}{2} \right\rfloor \text{ and } n_{i,1} = n_i - \left\lfloor \frac{n_i}{2} \right\rfloor,$$

otherwise.

In one example of Ex 6B-7, $$n_{i,1} = \left\lfloor \frac{n_i}{2} \right\rfloor \text{ and } n_{i,2} = n_i - \left\lfloor \frac{n_i}{2} \right\rfloor$$

if the strongest coefficient indicator (SCI) for layer i belong to the $2^{nd}$ antenna polarization;

$$n_{i,2} = \left\lfloor \frac{n_i}{2} \right\rfloor \text{ and } n_{i,1} = n_i - \left\lfloor \frac{n_i}{2} \right\rfloor,$$

otherwise.

At least one of the following alternatives (Alt) is used to report the $(n_{i,1}, n_{i,2})$ SD basis vectors for all layers $i \in \{0, 1, \ldots, \mathrm{RI}-1\}$.

In one embodiment of Alt 6B-0, the set of values $\{(n_{i,1}, n_{i,2})\}$ is fixed for each RI value, and for each layer i, the indices of $(n_{i,1}, n_{i,2})$ selected basis vectors are reported according to at least one of the following alternatives.

In one example of Alt 6B-0-0, for each $k \in \{1,2\}$, the indices of $n_{i,k}$ selected basis vectors are reported using a bitmap of length L.

In one example of Alt 6B-0-1, for each $k \in \{1,2\}$, the indices of $n_{i,k}$ selected basis vectors are reported using a combinatorial index $$x \in \left\{0, 1, \ldots, \binom{L}{n_{i,k}} - 1\right\}.$$

In one embodiment of Alt 6B-1, the set of values $\{(n_{i,1}, n_{i,2})\}$ is also reported by the UE, and the indices of $(n_{i,1}, n_{i,2})$ selected basis vectors are reported according to at least one of the following alternatives.

In one example of Alt 6B-1-0, for each $k \in \{1,2\}$, the set of values $\{n_{i,k}\}$ and the indices of $n_{i,k}$ selected basis vectors are reported jointly using a bitmap. In one instance, an independent bitmap (of length L) is used for each layer, hence the length of the bitmap is L×RI.

In one example of Alt 6B-1-1, for each $k \in \{1, 2\}$, the set of values $\{n_{i,k}\}$ and the indices of $n_{i,k}$ selected basis vectors are reported independently. In one instance, the set of values $\{n_{i,k}\}$ is reported using an index (I) as proposed in some embodiment of the present disclosure, and for each layer i, the indices of $n_{i,k}$ selected basis vectors are reported using a bitmap of length L. In another instance, the set of values $\{n_{i,k}\}$ is reported using an index (I) as proposed in some embodiment of the present disclosure, and for each layer i, the indices of $n_{i,k}$ selected basis vectors are reported using a combinatorial index $$x \in \left\{0, 1, \ldots, \binom{L}{n_{i,k}} - 1\right\}.$$

In a variation, when RI=3-4, for each antenna polarization $k \in \{1,2\}$, the UE is configured to select/report a L SD basis vectors for all layers, order/sort the selected L SD basis vectors, and for layer $i \in \{0, 1, \ldots, \mathrm{RI}-1\}$, for each $k \in \{1, 2\}$, the UE selects $n_{i,k}$ SD basis vectors from the ordered/sorted L SD basis vectors, where $n_{i,k} \leq L$. For each $k \in \{1, 2\}$, the UE reports the L SD basis vectors and their ordering/sorting information either jointly of separately.

In one example, the ordering/sorting of L SD basis vectors is in decreasing power level of the L SD basis vectors. For layer i, the UE selects the $n_{i,k}$ "strongest" basis vectors which corresponds to SD basis vectors the maximum power.

In one embodiment 7, a UE is configured with parameters (L,p) via higher layer signaling, where L indicates a number of SD basis vectors and p indicates a number of FD basis vectors M (e.g., $M = \lceil p \times N_{SB} \rceil = \lceil p \times N_3/R \rceil$ where $N_{SB}$ is number of SBs, $N_3$ is number of FD units for PMI reporting, and R is a higher layer parameter). When $\mathrm{RI} \in \{1,2\}$, then for each layer $l \in 0,1$, the number of SD basis vectors equals L and number of FD basis vectors equals M. When $\mathrm{RI} \in \{3,4\}$, then: for each layer $l \in \{0,1\}$, the number of SD basis vectors equals L and number of FD basis vectors equals M; and for each layer $l \in \{2,3\}$, the number of SD basis vectors equals L' and number of FD basis vectors equals M', where $L' \leq L$ and $p' \leq p$ (or $M' \leq M$).

At least one of the following alternatives is used for (L,p) and (L',p').

In one alternative (Alt 7-0), both (L,p) and (L',p') are fixed according to at least one of the following alternatives.

In one example of Alt 7-0-0, $(L,p) = (2, \frac{1}{4})$, and $(L',p') = (L, p) = (2, \frac{1}{4})$.

In one example of Alt 7-0-1, $$(L, p) = \left(2, \frac{1}{2}\right), \text{ and } (L', p') = \left(L, \frac{p}{2}\right) = \left(2, \frac{1}{4}\right).$$

In one example of Alt 7-0-2, $$(L, p) = \left(4, \frac{1}{4}\right), \text{ and } (L', p') = \left(\frac{L}{2}, p\right) = \left(2, \frac{1}{4}\right).$$

In one example of Alt 7-0-3, $$(L, p) = \left(4, \frac{1}{2}\right), \text{ and } (L', p') = \left(\frac{L}{2}, \frac{p}{2}\right) = \left(2, \frac{1}{4}\right).$$

In one alternative (Alt 7-1), $(L',p') = (2, \frac{1}{4})$ is fixed, L=2 is fixed, and $p \in \{\frac{1}{4}, \frac{1}{2}\}$ are higher layer configured.

In one alternative (Alt 7-2), $(L',p') = (2, \frac{1}{4})$ is fixed, $p = \frac{1}{4}$ is fixed, and $L \in \{2,4\}$ is higher layer configured.

In one alternative (Alt 7-3), $(L',p') = (2, \frac{1}{4})$ is fixed, and both $L \in \{2,4\}$ and $p \in \{\frac{1}{4}, \frac{1}{2}\}$ are higher layer configured.

In one alternative (Alt 7-4), $(L,p) = (4, \frac{1}{2})$ is fixed, L'=2 is fixed, and $p' \in \{\frac{1}{4}, \frac{1}{2}\}$ are higher layer configured.

In one alternative (Alt 7-5), $(L,p) = (4, \frac{1}{4})$ is fixed, $p' = \frac{1}{4}$ is fixed, and $L' \in \{2,4\}$ is higher layer configured.

In one alternative (Alt 7-6), $(L,p) = (4, \frac{1}{2})$ is fixed, and both $L' \in \{2,4\}$ and $p' \in \{\frac{1}{4}, \frac{1}{2}\}$ are higher layer configured.

In one alternative (Alt 7-7), $(L,p) = (4, \frac{1}{4})$ is fixed, L'=2 is fixed, and $p' = \frac{1}{4}$ is fixed.

In one alternative (Alt 7-8), $(L,p) = (4, \frac{1}{4})$ is fixed, $L' \in \{2, 4\}$ is higher layer configured, and $p' = \frac{1}{4}$ is fixed.

In one alternative (Alt 7-9), $(L,p) = (2, \frac{1}{2})$ is fixed, L'=2 is fixed, and $p' = \frac{1}{4}$ is fixed.

In one alternative (Alt 7-10), $(L,p) = (2, \frac{1}{2})$ is fixed, L'=2 is fixed, and $p' \in \{\frac{1}{4}, \frac{1}{2}\}$ are higher layer configured.

In one alternative (Alt 7-11), $(L,p) = (2, \frac{1}{4})$ is fixed, L'=2 is fixed, and $p' = \frac{1}{4}$ is fixed.

In more than one of these alternatives is supported, then one of them is either configured or reported by the UE.

In one embodiment 7A, a UE is configured with parameters (L,p) via higher layer signaling, where L indicates a number of SD basis vectors and p indicates a number of FD basis vectors M (e.g., $M = \lceil p \times N_{SB} \rceil = \lceil p \times N_3/R \rceil$ where $N_{SB}$ is number of SBs, $N_3$ is number of FD units for PMI reporting, and R is a higher layer parameter). When $\mathrm{RI} \in \{1,2\}$, then for each layer $l \in 0,1$, the number of SD basis vectors equals L and number of FD basis vectors equals M.

When $\mathrm{RI} \in \{3,4\}$, then: for each layer $l \in \{0,1\}$, the number of SD basis vectors equals $L_0$ and number of FD basis vectors equals $M_0$ (or $p_0$); and for each layer $l \in \{2,3\}$, the number of SD basis vectors equals $L_1$ and number of FD basis vectors equals $M_1$ (or $p_1$).

Here, for $k \in \{0,1\}$, $L_k \leq L$ and $p_k \leq p$ (or $M_k \leq M$). A few examples of parameters $(L_0,L_1)$ and $(p_0,p_1)$ is shown in TABLE 15. For L=4, at least one of the following alternatives is used.

In one example of Alt 7A-0, all three values of I indicating $(L_0, L_1)$ combinations are supported. One of the supported combinations is either configured or reported by the UE.

In one example of Alt 7A-1, two of the three values of I indicating $(L_0, L_1)$ combinations are supported (e.g., I=1, 2). One of the two supported combinations is either configured or reported by the UE.

In one example of Alt 7A-2, only one of the three values of I indicating $(L_0, L_1)$ combinations is supported (e.g., I=1).

Likewise, for p=½, at least one of the following alternatives is used.

In one example of Alt 7A-3, all three values of J indicating $(p_0,p_1)$ combinations are supported. One of the supported combinations is either configured or reported by the UE.

In one example of Alt 7A-4, two of the three values of J indicating $(p_0,p_1)$ combinations are supported (e.g., J=1, 2). One of the two supported combinations is either configured or reported by the UE.

In one example of Alt 7A-5, only one of the three values of J indicating $(p_0,p_1)$ combinations is supported (e.g., J=1).

When both I and J are configured, then both I and J are configured either separately (using two separate configuration parameters) or jointly (using a single configuration parameter). Likewise, when both I and J are reported by the UE, then both I and J are reported either separately (using two separate CSI reporting parameters) or jointly (using a single CSI reporting parameter).

TABLE 15

Examples of $(L_0, L_1)$ and $(p_0, p_1)$

| I | L | $L_0$ for layer 0-1 | $L_0$ for layer 2-3 | J | p | $p_0$ for layer 0-1 | $p_0$ for layer 2-3 |
|---|---|---|---|---|---|---|---|
| 0 | 2 | 2 | 2 | 0 | ¼ | ¼ | ¼ |
| 0 | 4 | 4 | 4 | 0 | ½ | ½ | ½ |
| 1 | 4 | 4 | 2 | 1 |   | ½ | ¼ |
| 2 | 2 | 2 | 2 | 2 |   | ¼ | ¼ |

In one embodiment 7B, a UE is configured with parameters (L,p) via higher layer signaling, where L indicates a number of SD basis vectors and p indicates a number of FD basis vectors M (e.g., $M = \lceil p \times N_{SB} \rceil = \lceil p \times N_3/R \rceil$ where $N_{SB}$ is number of SBs, $N_3$ is number of FD units for PMI reporting, and R is a higher layer parameter). When $RI \in \{1,2\}$, then for each layer $l \in 0,1$, the number of SD basis vectors equals L and number of FD basis vectors equals M.

When RI=3, then: for each layer $l \in \{(0,1)\}$, the number of SD basis vectors equals $L_0$ and number of FD basis vectors equals $M_0$ (or $p_0$); and for each layer l=2 the number of SD basis vectors equals $L_1$ and number of FD basis vectors equals $M_1$ (or $p_1$).

When RI=4, then: for each layer $l \in \{(0,1)\}$, the number of SD basis vectors equals $L'_0$ and number of FD basis vectors equals $M'_0$ (or $p'_0$); and for each layer $l \in \{2,3\}$, the number of SD basis vectors equals $L'_1$ and number of FD basis vectors equals $M'_1$ (or $p'_1$).

Here, for $k \in \{0,1\}$, $L_k, L'_k \leq L$ and $p_k, p'_k \leq p$ (or $M_k, M'_k \leq M$). A few examples of parameters $(L_0,L_1)$ and $(p_0,p_1)$ is shown in TABLE 15. A few examples of parameters $(L'_0,L'_1)$ and $(p_0,p_1)$ is shown in TABLE 16.

For RI=3, the rest of the details (such as configuration/reporting) about $(L_0,L_1)$ and $(p_0,p_1)$ are the same as in embodiment 7A. For RI=3, when L=4, at least one of the following alternatives is used.

In one example of Alt 7B-0, all three values of I' indicating $(L'_0,L'_1)$ combinations are supported. One of the supported combinations is either configured or reported by the UE.

In one example of Alt 7B-1, two of the three values of I' indicating $(L'_0, L'_1)$ combinations are supported (e.g., I'=1, 2). One of the two supported combinations is either configured or reported by the UE.

In one example of Alt 7B-2, only one of the three values of 'I indicating $(L'_0,L'_1)$ combinations is supported (e.g., I'=1).

Likewise, for p=½, at least one of the following alternatives is used.

In one example of Alt 7B-3, all three values of J' indicating $(p'_0,p'_1)$ combinations are supported. One of the supported combinations is either configured or reported by the UE.

In one example of Alt 7B-4, two of the three values of J' indicating $(p'_0,p'_1)$ combinations are supported (e.g., J'=1,2). One of the two supported combinations is either configured or reported by the UE.

In one example of Alt 7B-5, only one of the three values of J' indicating $(p'_0,p'_1)$ combinations is supported (e.g., J'=1).

When both I' and J' are configured, then both I' and J' are configured either separately (using two separate configuration parameters) or jointly (using a single configuration parameter). Likewise, when both I' and J' are reported by the UE, then both I' and J' are reported either separately (using two separate CSI reporting parameters) or jointly (using a single CSI reporting parameter).

TABLE 16

Examples of $(L'_0, L'_1)$ and $(p'_0, p'_1)$

| I' | L | $L'_0$ for layer 0-1 | $L'_0$ for layer 2-3 | J' | p | $p'_0$ for layer 0-1 | $p'_0$ for layer 2-3 |
|---|---|---|---|---|---|---|---|
| 0 | 2 | 2 | 2 | 0 | ¼ | ¼ | ¼ |
| 0 | 4 | 4 | 4 | 0 | ½ | ½ | ½ |
| 1 | 4 | 4 | 2 | 1 |   | ½ | ¼ |
| 2 | 2 | 2 | 2 | 2 |   | ¼ | ¼ |

At least one of the following alternatives is used for (I,I') and (J,J').

In one example of Alt 7B-6: I=I', J=J'. In another example of Alt 7B-7: I=I', J≠J'. In yet another example of Alt 7B-8: I≠I', J=J'. In yet another example of Alt 7B-9: I≠I', J≠J'.

When both I and I' are configured, then both I and I' are configured either separately (using two separate configuration parameters) or jointly (using a single configuration parameter). Likewise, when both I and I' are reported by the UE, then both I and I' are reported either separately (using two separate CSI reporting parameters) or jointly (using a single CSI reporting parameter).

When both J and J' are configured, then both J and J' are configured either separately (using two separate configuration parameters) or jointly (using a single configuration parameter). Likewise, when both J and J' are reported by the UE, then both J and J' are reported either separately (using two separate CSI reporting parameters) or jointly (using a single CSI reporting parameter).

When both (I,I') and (J,J') are configured, then both (I,I') and (J,J') are configured either separately (using two separate configuration parameters) or jointly (using a single configuration parameter). Likewise, when both (I,I') and (J,J') are reported by the UE, then both (I,I') and (J,J') are reported either separately (using two separate CSI reporting parameters) or jointly (using a single CSI reporting parameter).

Figure 15:
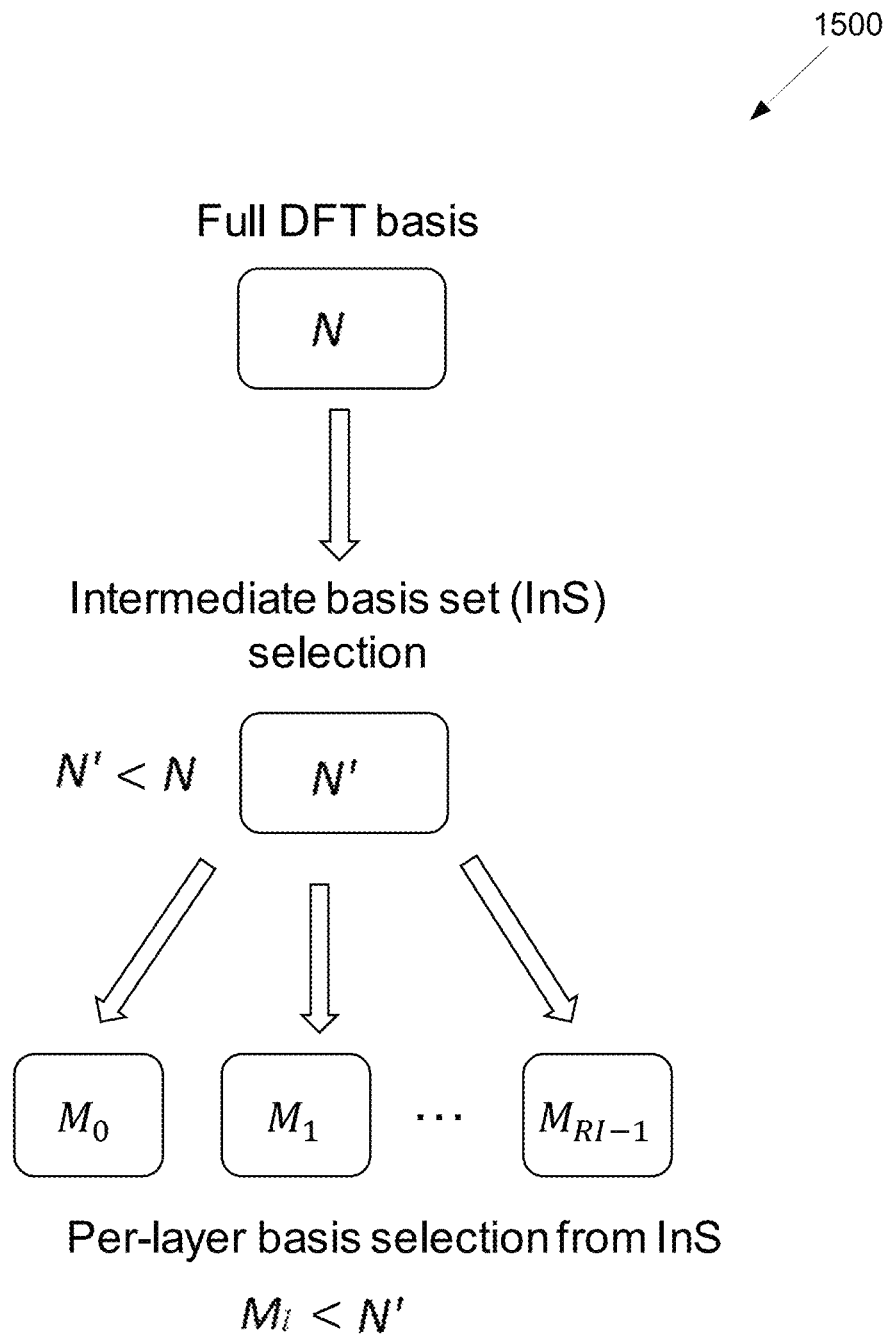
FIG. 15 illustrates a diagram for two-step basis selection according to embodiments of the present disclosure.

FIG. 15 illustrates a diagram 1500 for two-step basis selection according to embodiments of the present disclosure. The embodiment of the two-step basis selection illustrated in FIG. 15 is for illustration only. FIG. 15 does not limit the scope of the present disclosure to any particular implementation.

As illustrated in FIG. 15, for the first step, the UE 116 selects an intermediate basis set (InS) including N' DFT bases from a full basis set of N bases with N' being less than N. These N' DFT bases that are common among a plurality of v layers where v is the rank value (i.e., the RI). For the second step, the UE 116 selects per-layer basis subsets where the number of subsets is $M_l$ with l=0, 1, . . . , RI−1 and $M_l$ being less than N'. These per-layer basis subset are selected from the bases included in the InS. UE 116 may then report both the indices of the bases selected in the InS as well as the indices of the bases selected in each of the per-layer basis subsets (e.g., in a PMI for a CSI report). By virtue of this two-step basis selection, the UE 116 may reduce the amount of overhead signaling that otherwise may be required for high-resolution CSI reporting in that the UE 116 performs a two-step selection process to determine the indices of the basis to report from the InS rather than needing to report them from the full DFT basis set.

Figure 16:
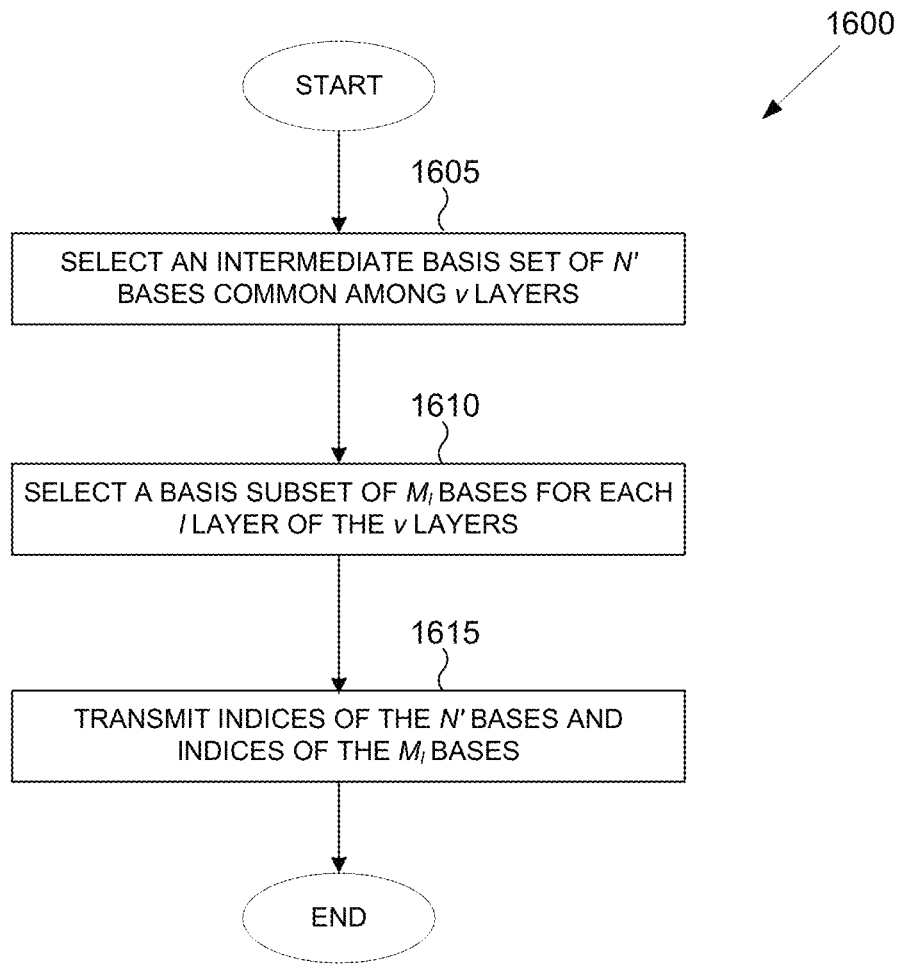
FIG. 16 illustrates a flowchart of a method for operating a UE according to embodiments of the present disclosure.

FIG. 16 illustrates a flowchart of a method 1600 for operating a UE according to embodiments of the present disclosure. The embodiment of the method 1600 illustrated in FIG. 16 is for illustration only. FIG. 16 does not limit the scope of the present disclosure to any particular implementation. The method 1600 may be an example of UE implementation of the two step basis selection process discussed in FIG. 15 above. The method 1600 may be performed by a UE such as UE 116 or any other UEs discussed herein.

The method 1600 begins with the UE 116 selecting an intermediate basis set including N' bases that are common among a plurality of v layers (step 1605). For example, in step 1605, the UE 116 may select from a full basis set comprising N bases for the plurality of v layers. The full basis set may be a set of DFT vectors $\{w_{r+nO}: n \in \{0, 1, \ldots, (N-1)\}\}$, where O is an oversampling factor for the set of DFT vectors, $r \in \{0, 1, \ldots, O-1\}$ is an index of a first DFT vector in the set of DFT vectors, and $$w_k = \left[ 1 \quad e^{j\frac{2\pi k}{ON}} \ldots e^{j\frac{2\pi k(N-1)}{ON}} \right]$$

is a DFT vector. N and N' are positive integers; N'<N; and v is a rank value. The UE 116 may determine the number of bases N' to include in the intermediate basis set (i.e., the value of N') in a number of manners. For example, the UE 116 may determine a value of N' based on higher layer signaling received by the transceiver from the BS. In another example, the value of N' is fixed according to a predetermined configuration. In another example, the UE may determine and/or transmit information about the value of N' to the BS. As part of this step, the N' bases intermediate basis set are common to the or included a basis for at least one of the v layers.

The UE 116 then selects, from the selected intermediate basis set, a basis subset including $M_l$ bases for each layer l of the plurality of v layers (step 1610). For example, in step 1610, the UE 116 selects bases for each of the v layers from layer 0 to layer v−1 from the bases included in the previously selected intermediate basis set. $M_l$ is a positive integer; $M_l$<N'; and l=0, 1, . . . , v−1.

Thereafter, the UE 116 transmits, to a BS (e.g., BS 102), indices of the N' bases included in the selected intermediate basis set and indices of the $M_l$ bases included in the selected basis subsets (step 1615). For example, in step 1615, the UE 116 may report the indices of all the selected bases to the BS 102. In one embodiment, for this step, the UE 116 may transmit a previously determined CSI report to the BS and this CSI report includes a RI indicating the rank value and a PMI indicating indices of the N' bases included in the selected intermediate basis set and indices of the $M_l$ bases included in the selected basis subsets.

The BS 102 may perform a reciprocal process in that the BS 102 receives the indices and/or CSI reporting from the UE 116 as described above and, therefrom, determines $M_l$ bases for each layer l of the plurality of v layers based on the received indices of the N' bases included in the intermediate basis set and the received indices of the $M_l$ bases included in the basis subsets. By virtue of this process, the UE 116 may reduce the amount of overhead signaling required for CSI reporting in that the UE 116 performs a two-step selection process to determine the indices of the basis to report from the InS rather than needing to report them from the full basis set.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:
1. A user equipment (UE), the UE comprising:
 a transceiver; and
 a processor configured to:
  receive, via the transceiver, configuration information including information for a channel state information (CSI) report, the configuration information indicating a codebook type,
  identify an intermediate basis set including N' basis vectors common to a plurality of layers, based on a full basis set including N basis vectors, and
  identify a basis subset including $M_l$ basis vectors each specific to a layer l of the plurality of layers, based on the intermediate basis set, and
  transmit, via the transceiver, the CSI report including a pre-coding matrix indicator (PMI) regarding the N' basis vectors included in the intermediate basis set and the $M_l$ basis vectors included in the basis subset, to a base station,
 wherein N, N', and $M_l$ are positive integers, N'<N, $M_l$<N', and l is a value corresponding to a number of the one or more layers.
2. The UE of claim 1, wherein the PMI includes indicators indicating indices of the N' basis vectors included in the intermediate basis set.

3. The UE of claim 1, wherein the PMI includes indicators indicating indices of the $M_l$ basis vectors included in the basis subset.

4. The UE of claim 1, wherein a value of the $M_l$ basis vectors of the basis subset is determined based on the configuration information received from the BS.

5. The UE of claim 1, wherein the codebook type is set to type 2 based on the configuration information.

6. The UE of claim 1, wherein the codebook type corresponds to a total number of precoding matrices indicated by the PMI.

7. The UE of claim 1, wherein a value of $M_l$ for each of the basis subsets is determined based on configuration information received from the BS.

8. A base station (BS), the BS comprising:
a processor; and
a transceiver configured to
transmit, to a user equipment (UE), configuration information including information for a channel state information (CSI) report, the configuration information indicating a codebook type, wherein an intermediate basis set including N' basis vectors common to a plurality of layers is based on a full basis set including N basis vectors, wherein a basis subset including $M_l$ basis vectors each specific to a layer l of the plurality of layers is based on the intermediate basis set, and
receive, from the UE, the CSI report including a pre-coding matric indicator (PMI) regarding the basis vectors included in the intermediate basis set and the $M_l$ basis vectors included in the basis subset, from the UE,
wherein N, N', and $M_l$ are positive integers, N'<N, $M_l$<N', and l is a value corresponding to a number of the one or more layers.

9. The BS of claim 8, wherein the PMI includes indicators indicating indices of the N' basis vectors included in the intermediate basis set.

10. The BS of claim 8, wherein the PMI includes indicators indicating indices of the $M_l$ basis vectors included in the basis subset.

11. The BS of claim 8, wherein a value of the $M_l$ basis vectors of the basis subset is determined based on the configuration information received from the BS.

12. The BS of claim 8, wherein the codebook type is set to type 2 based on the configuration information.

13. The BS of claim 8, wherein the codebook type corresponds to a total number of precoding matrices indicated by the PMI.

14. The BS of claim 8, wherein a value of $M_l$ for each of the basis subsets is indicated in configuration information transmitted by the transceiver to the UE.

15. A method for operating a user equipment (UE), the method comprising:
receiving configuration information including information for a channel state information (CSI) report, the configuration information indicating a codebook type;
identifying an intermediate basis set including N' basis vectors common to a plurality of layers, based on a full basis set including N basis vectors;
identifying a basis subset including $M_l$ basis vectors each specific to a layer l of the plurality of layers, based on the intermediate basis set; and
transmitting the CSI report including a pre-coding matrix indicator (PMI) regarding the N' basis vectors included in the intermediate basis set and the $M_l$ basis vectors included in the basis subset, to a base station,
wherein N, N', and $M_l$ are positive integers, N'<N, $M_l$<N', and l is a value corresponding to a number of the one or more layers.

16. The method of claim 15, wherein the PMI includes indicators indicating the indices of the N' basis vectors included in the intermediate basis set.

17. The method of claim 15, wherein the PMI includes indicators indicating indices of the $M_l$ basis vectors included in the basis subset.

18. The method of claim 15, wherein a value of the $M_l$ basis vectors of the basis subset is determined based on the configuration information received from the BS.

19. The method of claim 15, wherein the codebook type is set to type 2 based on the configuration information.

20. The method of claim 15, wherein the codebook type corresponds to a total number of precoding matrices indicated by the PMI.

* * * * *